Fig. 1

Sept. 20, 1938.  R. A. STEPS  2,130,864
CENTRIFUGAL CONTROL APPARATUS
Filed Aug. 22, 1934   5 Sheets-Sheet 3
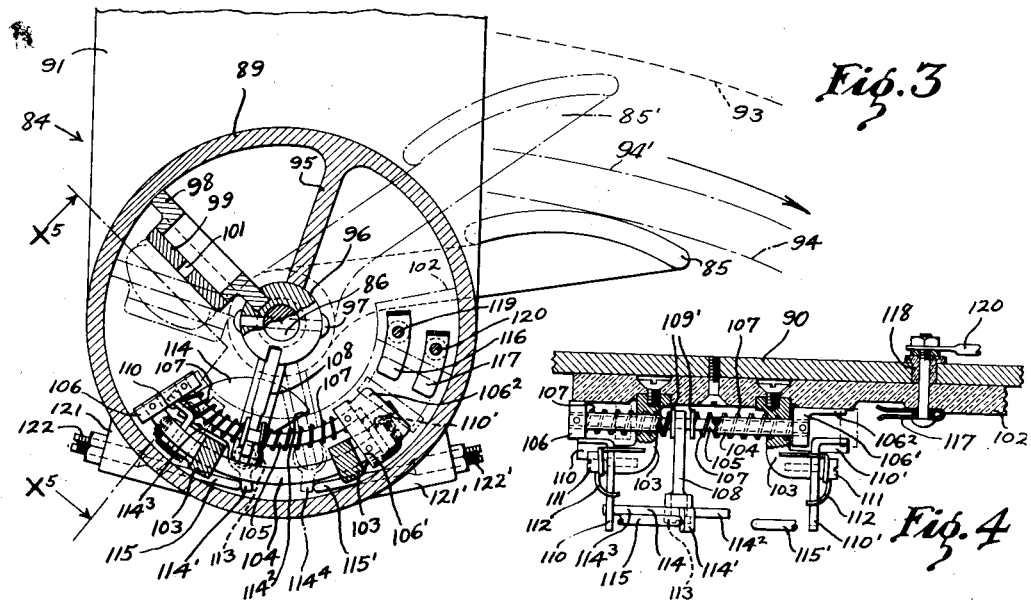
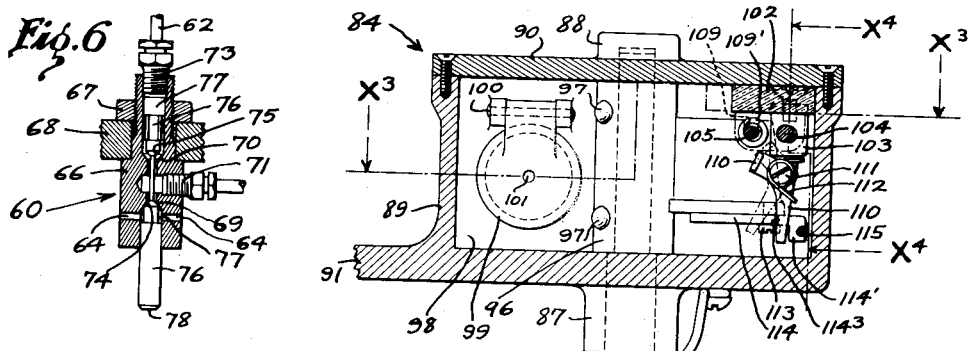
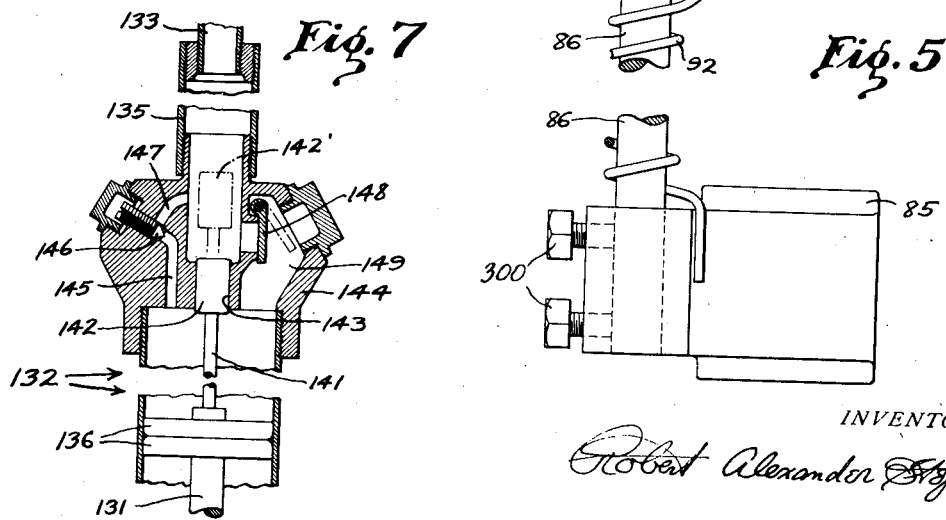
INVENTOR
Robert Alexander Steps Sept. 20, 1938.  R. A. STEPS  2,130,864
CENTRIFUGAL CONTROL APPARATUS
Filed Aug. 22, 1934   5 Sheets-Sheet 4
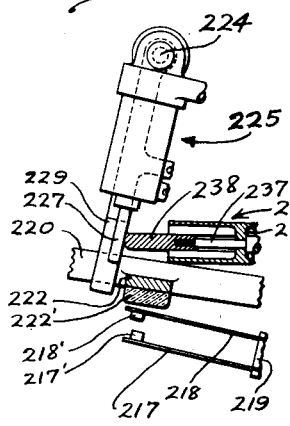
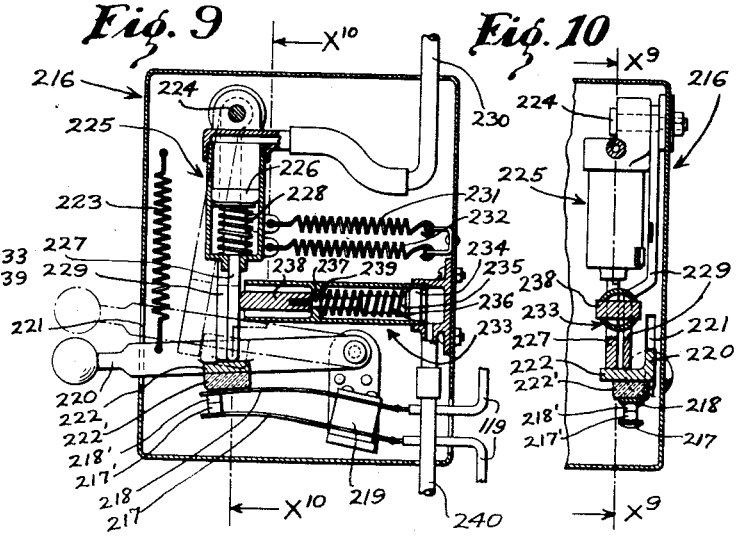
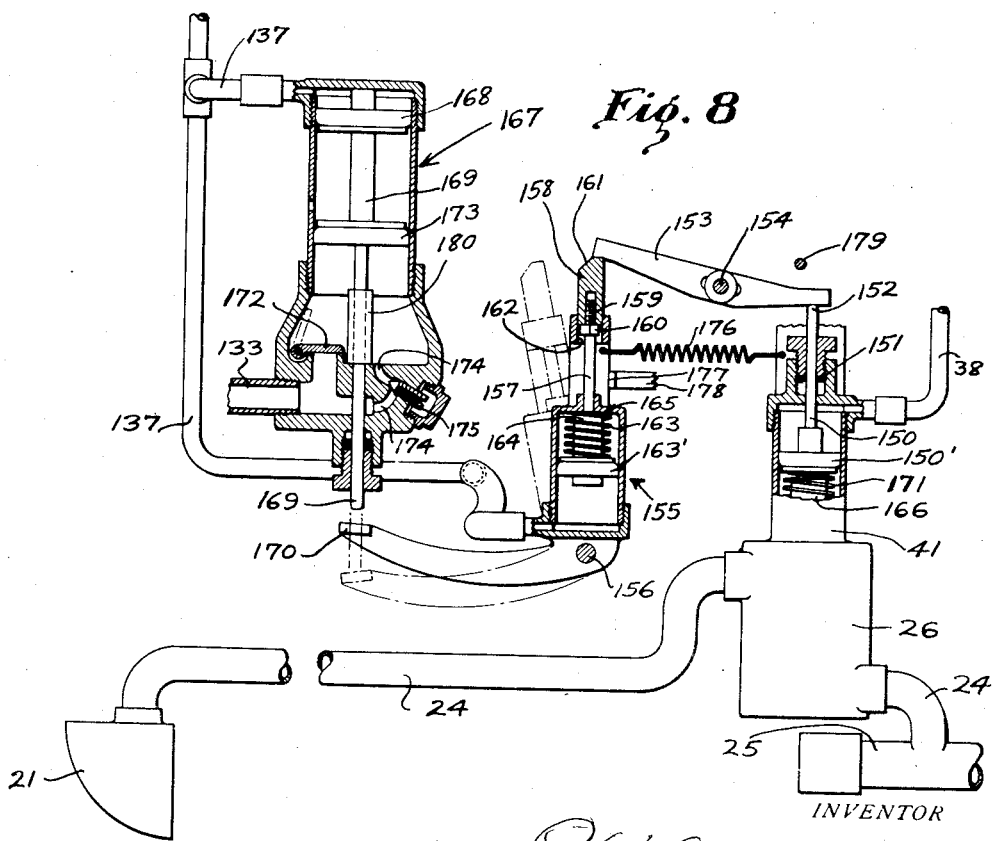
INVENTOR
Robert Alexander Steps

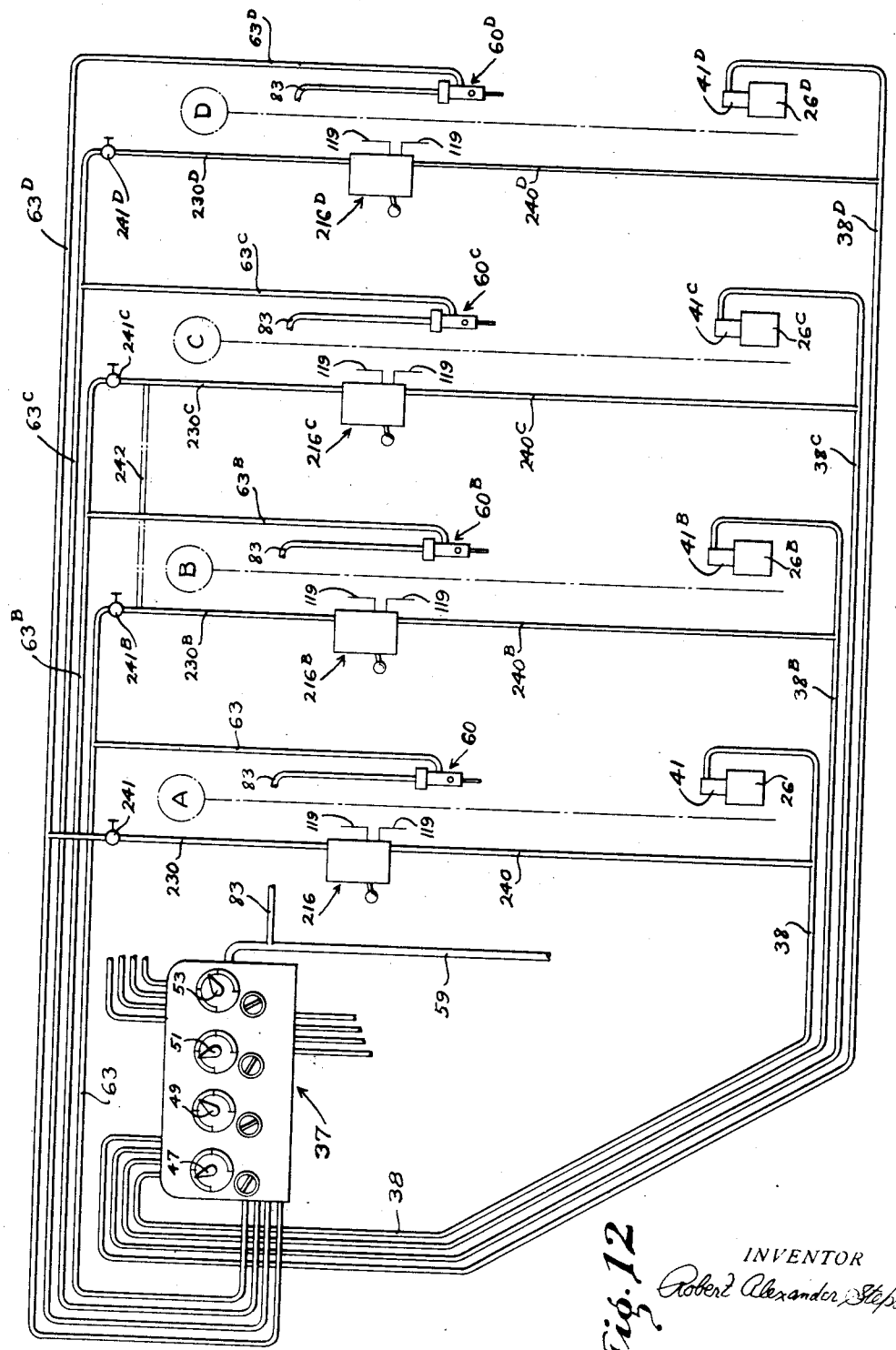

Patented Sept. 20, 1938

2,130,864

UNITED STATES PATENT OFFICE 2,130,864

CENTRIFUGAL CONTROL APPARATUS

Robert Alexander Steps, Los Angeles, Calif.

Application August 22, 1934, Serial No. 741,017

28 Claims. (Cl. 210—71)

My invention relates to control apparatus for centrifugal machines of the various types used in the sugar, chemical, mining and other industries, and in particular to those types of such centrifugals as operate on a cycle basis roughly consisting of starting the centrifugal from approximate rest and charging it at low speed or at rest, then centrifuging the charge at comparatively high speed and performing or omitting certain cycle operations as the industry or character of the charge may require, and subsequently stopping the centrifugal and removing the charge therefrom preparatory to re-starting and re-charging the centrifugal to repeat the cycle just described.

Among the various objects and purposes of this invention, and of the various parts and subcombinations thereof, I wish in particular to mention the following:

It is an object of this invention to provide simple, efficient and successful continuous control apparatus for continuously leading or controlling centrifugals of the above character through cycle after cycle without the intervention of human attention, except as is required to supervise the equipment and make repairs if and when needed.

Since in practice such centrifugals substantially always operate in a group or battery comprising a plurality of such centrifugals all driven from a common power source of some sort, it is a further object of this invention to incorporate in such continuous control apparatus efficient pace-making equipment for the centrifugals such as will approximately keep them in suitable successive step or phase pace with respect to each other, that is to cause the various centrifugals to always start their cycles successively one after the other, because if they were allowed to creep or advance their operations against each other, this would occasionally result in all or too many of the centrifugals starting at approximately the same time, and this would impose such an extreme overload on the common power source from which the battery of centrifugals are driven as to render the entire arrangement of such continuous control rather impractical and inefficient.

Various other objects and purposes of this invention, and of the parts and subcombinations thereof, will become apparent through consideration of the accompanying drawings, of the following description, and of the appended claims.

In the accompanying drawings Fig. 1 is a diagrammatic view of one form of my continuous control apparatus as applied to one centrifugal.

Fig. 3 is a plan view partly in section along the broken line $X^3$—$X^3$ of Fig. 5, showing one form of an automatic starting and gate-closing equipment which I use.

Fig. 4 is a fragmental elevation view developed into a flat plane for purposes of clearness, and showing only certain parts of the equipment illustrated in Fig. 3, this view,—Fig. 4,—being also a partial section taken along the broken line $X^4$—$X^4$ of Fig. 5, looking in the direction of the arrows.

Fig. 5 is an elevation partly in section, of the equipment shown in Fig. 3, the section being taken along the broken line $X^5$—$X^5$, Fig. 3, looking in the direction of the arrows, and some of the parts being assumed rotated into a common plane in order to clarify the illustration.

Fig. 6 is a sectional view of a form of valve that I sometimes use with this invention.

Fig. 7 is an enlarged view of a detail shown in Fig. 1.

Fig. 8 is another enlarged view, partly in section, of some details shown in Fig. 1.

Fig. 9 is a sectional view on broken line $X^9$—$X^9$ of Fig. 10, looking in the direction of the arrows, and illustrating a portion of one form of the pace-making equipment which I use.

Fig. 10 is a sectional view of the apparatus shown in Fig. 9, taken on broken line $X^{10}$—$X^{10}$ of Fig. 9, looking in the direction of the arrows.

Fig. 11 is a partial view of Fig. 9 disclosing some of the parts in a different position from that shown in Fig. 9.

Fig. 12 is a diagrammatic view illustrating one form of my pace-making equipment applied to a plurality of centrifugals for keeping them in successive phase pace with respect to each other, all parts not necessary for the clearness of Fig. 12, having been omitted therefrom.

Figure 1:
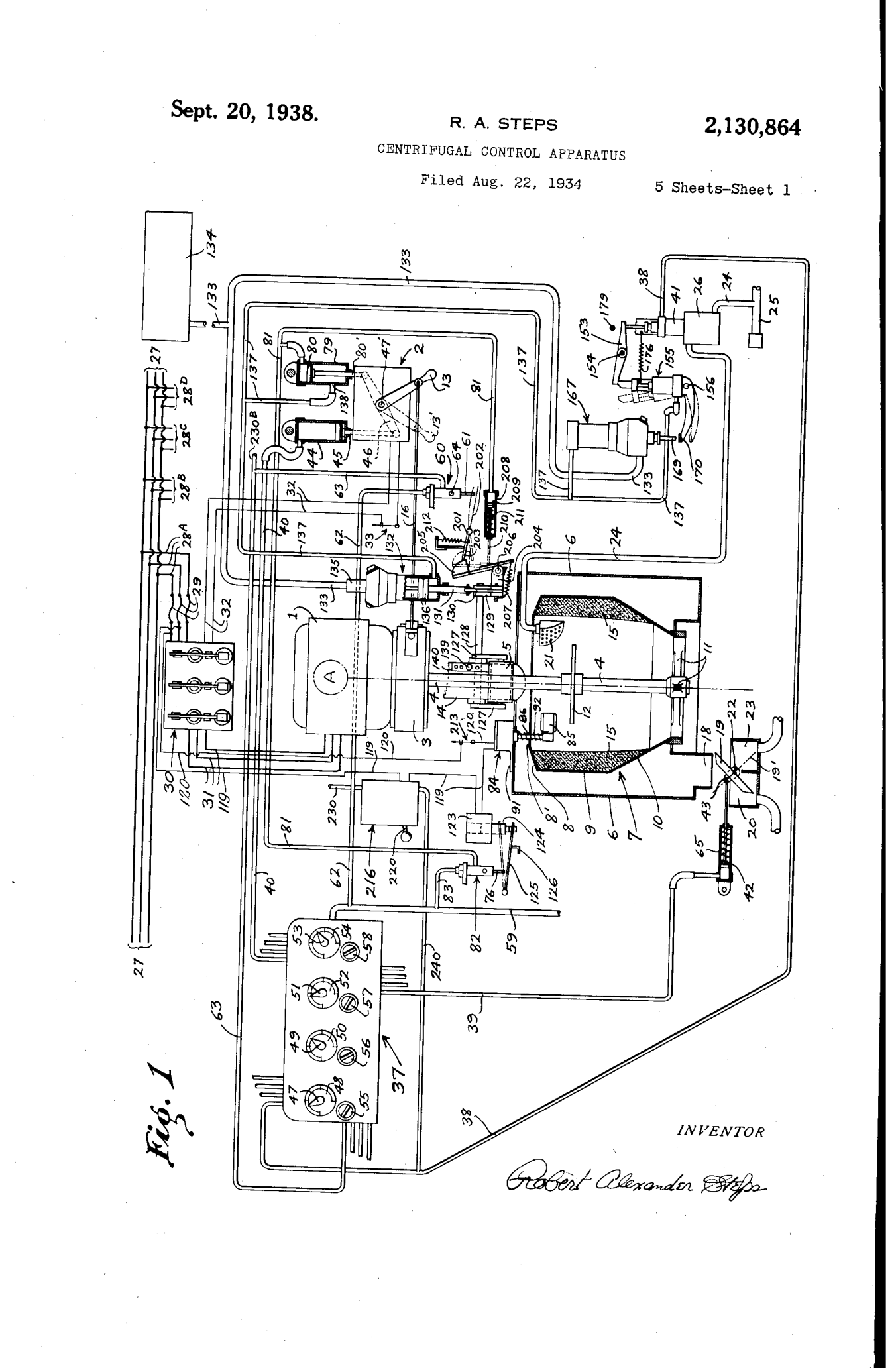
Figure 2:
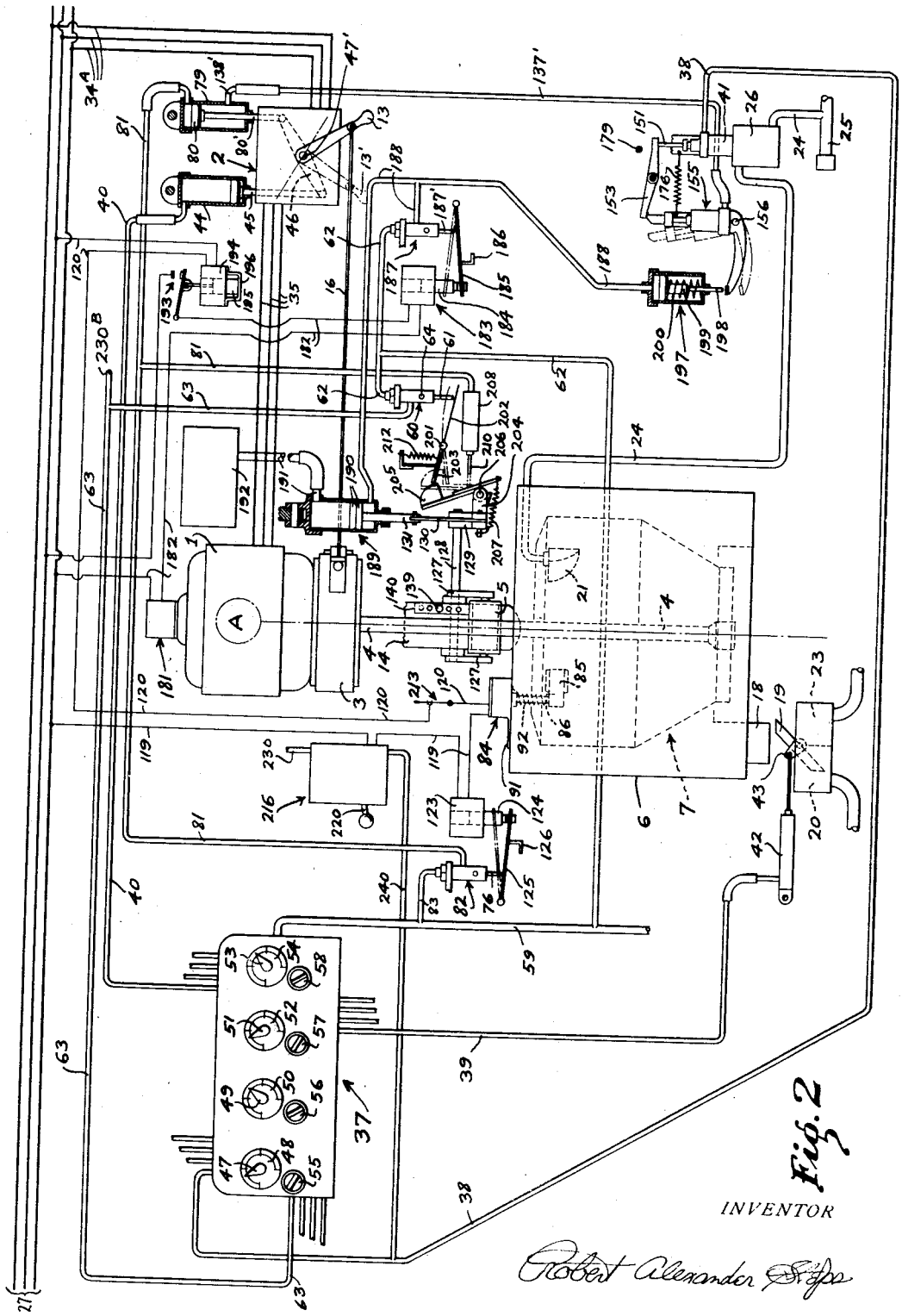
Fig. 2 is a similar view showing a modified form of my continuous control apparatus.

In considering the foregoing drawings and the following description, it should be noted that Figs. 1 and 2 on the one hand, and Fig. 12 on the other hand should be read together for the purpose of procuring a complete view of this invention in its most extended form, because Figs. 1 and 2 show only one centrifugal with a complement of control apparatus for same, the other centrifugals in the battery being omitted from these two figures for purposes of clearness, whereas in Fig. 12 a battery of four such centrifugals, each supposed to have a complete complement of control apparatus as shown in Figs. 1 and 2, is diagrammatically illustrated, but the actual details and parts of the centrifugals and control apparatus are omitted from Fig. 12 for purposes of clearness, except such parts as are necessary for illustrating the action of the pace-making equipment between the several centrifugals, and these parts are diagrammatically illustrated in Fig. 12.

Of course various parts and sub-combinations of my entire invention, either in the precise form or with extended modification thereof, may on occasion have separate use other than in combination with the entire control apparatus hereinafter disclosed, but all this is contemplated by, and is within the spirit and purpose of my invention, which is limited only by the terms of the appended claims.

Figs. 1 and 2 illustrate an ordinary centrifugal having drive motor 1, starting switch 2, brake 3, spindle 4, charging gate 5, stationary curbing 6, and revolving basket 7 mounted on spindle 4 and revolved therewith in usual manner.

Such a centrifugal is known as a direct-connected electric-driven centrifugal, and this type has been selected as an example for the purpose of illustrating my invention in general, but it will be understood that my invention is equally applicable to other types as for instance water-driven, belt-driven or gear-driven centrifugals, as the modifications necessary to associate my invention with such other types of centrifugals lie well within the capacity of an ordinary mechanic.

Basket 7 as illustrated in Fig. 1 is known as a conical bottom self-discharging basket, and this type of basket has particular combination and co-action with certain forms and aspects of my invention, and in that respect is an essential part thereof, but other forms, aspects and parts of my invention are not limited in usefulness to such conical bottom self-discharging basket, but will work as well with other types of baskets, as for instance the well known flat or closed bottom basket which must be mechanically discharged, and therefore I must point out that some forms, aspects and parts of my invention are not limited to use with the conical bottom self-discharging basket shown in Fig. 1.

As is well known such a self-discharging basket has the usual cap 8, foraminous cylindrical wall 9, foraminous conical bottom 10, and spokes 11 joining it to spindle 4. The bottom of the basket always remains open between spokes 11. At a suitable place on spindle 4 is mounted the baffle 12 which rotates with the spindle and the basket.

The ordinary operation of this centrifugal, without control equipment, is as follows:

Through electrical connections that will be hereinafter mentioned, the centrifugal may be started to rotate by shifting handle 13 of switch box 2 to its dotted line position 13', Fig. 1. The gate 5 is then raised and the material to be charged into basket 7 pours from spout 14, past gate 5 onto baffle 12 which is rotating slowly, because the centrifugal has just started, and from this rotating baffle the more or less fluidy charge is thrown outward against the basket wall comprising parts 8, 9, and 10 thereof, and in manner that is well known to those engaged in the art this charge distributes itself evenly on the basket wall approximately as illustrated in Fig. 1, and as the charging continues through gate 5, this mass or charge 15 builds itself up thicker and thicker in the basket measuring from the basket wall inward, and of course the gate 5 is presently closed, to stop the charging before charge 15 reaches the opening 8' in cap 8, as otherwise the charge would spill out over this cap which is undesirable.

When the charging is finished, the spinning of the centrifugal continues, usually at an increasing rate of speed, and the liquor that is intended to be separated from the charge pours through the foraminous wall of the revolving basket into stationary curbing 6, while the solid portion of the charge remains in and is collected by the basket, freed from the fluid that was spun out. At the end of the cycle, when the centrifuging of the charge is finished, switch handle 13 is swung back from its dotted line to its full line position at switch box 2, which opens the circuit on driving motor 1, and through the connecting rod 16 applies the brake 3 to stop the centrifugal. When a self-discharging basket of the general type shown in Fig. 1, is stopped, it is well known that the mass 15 need not be mechanically discharged from the basket, because this mass or charge being freed from the influence of centrifugal force, will fall from the basket through the openings between spokes 11, thus discharging itself, and making ready for re-starting and recharging the machine for the next cycle, which is merely a repetition of the operations already described.

According to the material that is being centrifuged, the simple cycle above described may be embellished by one or more additional cycle operations, the nature and character of these further steps or operations being always governed by the material, and its peculiar requirements. As an illustration, suppose the centrifugal is operating on white sugar filmasse in a sugar refinery, it being understood that such filmasse consists of white sugar crystals suspended in syrup. When working on this product, it is usual to allow the syrup to spin through the basket wall onto curb 6 from which it drains through opening 18 onto the movable gutter 19 into trough 20. After this syrup or mother liquor is spun out of the basket, it is usual to spray water or other washing fluid through nozzle 21 onto the sugar, and as this wash fluid also spins through the revolving basket wall and collects and drains down along curb 6, the gutter 19 is moved about its axis 22 into dotted line position 19', to collect this wash water in trough 23, as this wash water or fluid is of higher purity than the mother liquor collected in trough 20, and it is desirable for this reason to separate these two liquors by shifting gutter 19 at an appropriate moment in the cycle, as just stated. The wash fluid was supplied to spray nozzle 21 through pipe connections 24 coming from header 25 where the fluid is maintained at constant pressure from a source not shown. In these pipe connections 24 is a wash fluid valve 26, and when the latter is opened, the fluid sprays out from nozzle 21 to wash the charge in the revolving basket, and when valve 26 is closed, the flow of such fluid through nozzle 21 stops. Since the fluid pressure in header 25 is constant, the quantity of water that flows through nozzle 21, may be measured by the length of time the valve 26 is kept open. Therefore, when the centrifugal is operating on such white sugar filmasse, the additional or supplementary cycle operations above referred to consist first in turning on the wash fluid by opening valve 26, then shifting gutter 19 to discharge into trough 23 instead of into trough 20, then presently stopping the washing by closing valve 26, and eventually shifting gutter 19 to again discharge into trough 20 before the next cycle commences. As previously stated, this series of cycle operations is given only for purposes of illustration, and if the material that is centrifuged be other than white sugar, these cycle operations may be varied very extensively to suit the needs of such other material, and of course with some material there would be merely the simple cycle of starting, charging and stopping the centrifugal.

It is also understood that charging spout 14, leading to charging gate 5, itself communicates with a large supply tank or mixer that supplies the material to all the centrifugals in the battery, through similar charging spouts 14 with which the other centrifugals are equipped, but such tank or mixer is omitted from the drawings for purposes of clearness, as its construction is well known to those in the art.

Before proceeding further I will describe the electrical connections for driving centrifugal motor 1.

Referring to Fig. 1, it will be understood that the multiphase power line 27 is the common power source from which all centrifugal motors 1, in the battery of centrifugals, are driven. From this line the leads 28A pass through fuses 29, magnet switch 30, and leads 31, to motor 1, the relay magnet switch 30 being indicated only conventionally, as it is well-known standard equipment and needs no detailed illustration or description. From connections inside magnet switch 30 comes the single phase relay circuit 32 embracing hand switch 33, and leading to a standard type switch 2, which is of such type that when switch handle 13 is in its full line position, the relay circuit 32 is open and brake 3 set, but when this switch lever is shifted to the left, to its dotted line position 13', then relay circuit 32 is closed, and brake 3 is open. On such closing of relay circuit 32, the magnet switch 30 automatically closes in manner well understood in the trade, and drive motor 1 is energized from power line 27, through the connections recited, and the centrifugal commences to rotate. Since it is understood that the centrifugal illustrated in Fig. 1 is only one in a battery of four similar centrifugals, I have elected to designate this particular centrifugal as A, and the other three centrifugals, in manner that will become more apparent in connection with subsequent description of Fig. 12, I am designating, respectively, as B, C, and D. Consequently, in Fig. 1, for the purpose of showing these four centrifugals all driven from the common power source, namely line 27, I have indicated (near the upper right-hand corner of the drawing) the four outlets from this power line, respectively as 28A, 28B, 28C, and 28D, it being shown on this drawing how the first of these outlets is connected to motor 1 of the first centrifugal A, and it will be understood that the other three outlets, though shown broken off, are connected in identical manner with the drive motors 1, respectively of centrifugals B, C, and D.

In Fig. 2 the electrical drive connections from the multiphase power line 27, to centrifugal drive motor 1, are arranged somewhat differently, and may be described as follows. Here the outlets 34A pass directly from line 27 into switch box 2, which externally is like the similar switch box 2 in Fig. 1, but internally is a standard multiphase make and break switch, preferably of the quick-opening and quick-closing type, and from this switch box 2, in Fig. 2, the leads 35 pass direct into drive motor 1. In Fig. 2, as in Fig. 1, when switch lever 13 is in its full line position at the right, the said circuit from power line 27 to drive motor 1 is open and brake 3 is closed, and when this switch lever is swung leftward to its dotted line position 13', then brake 3 is opened and the power circuit is closed to motor 1 to drive the centrifugal. In this Fig. 2 the centrifugal shown is also designated as A, as it is regarded as the first of a battery of four similar centrifugals, and for this reason the outlets to it from power line 27, are designated as 34A, and it will be understood that outlets similar to 34A will pass from power line 27 to the other three centrifugals, B, C, and D, the outlets to the latter having been omitted from Fig. 2, merely because the available room in this latter figure does not permit showing them, although they are understood intended, even though omitted. In fact, the other connections from power line 27 to centrifugal A, as illustrated in Fig. 2, are all repeated for centrifugals B, C, and D, when the form of the invention as shown in Fig. 2 is used.

As previously mentioned, the present invention sometimes includes the performance of certain supplementary cycle steps or operations, usually performed on a time-controlled basis, and the presence or absence of such supplementary operations depends on the nature of the material that is centrifuged. For instance, it has been previously stated that in the centrifuging of white sugar filmasse in sugar refineries, I often include the step of automatically turning on the washing fluid at nozzle 21 at a predetermined time in the cycle, also the step of turning off this washing fluid at another predetermined time, also shifting the gutter 19 from trough 20 to trough 23 at another predetermined time, and the step of automatically stopping the centrifugal at another predetermined time, all these steps, or some of them, being automatically performed or controlled by a cycle timer, and I will now turn to the description of this cycle timer.

It will be understood, of course, that this timer just referred to, can be of any suitable form or construction whatsoever that is considered adequate for the purpose, but in the interest of simplicity in description and illustration, I have illustrated in Figs. 1 and 2 the type of cycle timer or control apparatus that is illustrated and described in complete detail in United States Patent No. 1,947,679, granted to me on February 20th, 1934, entitled: Master cycle control apparatus, and reference should be made to same for full particulars, as I am omitting from this application all details of this timer mechanism, believing that same is fully understood in view of my aforesaid Patent No. 1,947,679, only the barest necessary outline of such timer control being given here as is necessary to show its connection with the present invention.

In Figs. 1 and 2 the cabinet indicated generally by reference numeral 37 comprises the central part of this cycle timer, and it will be understood that the small copper tubes 38, 39, and 40 radiate therefrom toward the centrifugal to respectively supply compressed air to air cylinder 41 to open and subsequently close wash fluid valve 26, also to air cylinder 42 to shift gutter 19 from trough 20 to trough 23 through crank connection 43, also to air cylinder 44 behind switch box 2, the piston rod 45 of this cylinder being connected through crank 46 to switch box shaft 47', which shaft is also connected with switch lever 13, so that when compressed air is admitted to cylinder 44, piston rod 45 is extended to the position shown in Figs. 1 and 2, which shows the electric power cut off of drive motor 1, and brake 3 set, to stop the centrifugal as previously described. In view of the internal construction and operation of cycle timer 37, as fully described in my aforesaid patent, it is understood that the cycle time at which wash fluid starts flowing from nozzle 21, by opening of wash fluid valve 26 as just stated, is controlled by the setting of pointer 47 on dial 48, of timer cabinet 37; also the cycle time at which this wash fluid stops flowing by the automatic closing of valve 26, is controlled by the setting of pointer 49 on dial 50 of the timer; also that the cycle time at which gutter 19 shifts from trough 20 to trough 23 will be governed by the setting of pointer 51 on dial 52; and that the cycle time at which the power is automatically cut off and brake applied at switch box 2, is controlled by the setting of pointer 53 on dial 54 of the cycle timer 37, and it will be further understood that each of these cycle times or periods can be changed by respectively turning the adjusting wheels 55, 56, 57, and 58 of timer 37. The compressed air that issues from the timer 37, through the various tubes referred to, is supplied to this timer through the compressed air supply line 59, this in turn coming from an air compressor or supply source, not shown.

The moment from which cycle timer 37 commences to measure the various cycle periods of the time cycle just described, and as indicated by the pointers on the respective dials, is the moment when air valve 60 is opened, by lifting its stem 61. As will be more fully understood when this valve is described in connection with Fig. 6, the opening of this valve will result in allowing compressed air to flow through it from the feeder pipe 62, itself connected with supply line 59, out through tube 63 which is connected to timer 37 as illustrated. As long as this valve 60 is held open, and compressed air is supplied thereby through tube 63 to timer 37, the timer parts in timer 37 will stay locked to this centrifugal, and will either be measuring the cycle times therefor, or else will be holding the compressed air on the various cylinders 41, 42, or 44, previously described. When the upward pressure or lifting force is removed from the bottom of valve stem 61, of valve 60, so that this valve stem is permitted to fall, it is understood that the air supply from pipe 62 will be cut off through this valve, and the compressed air will be released from certain of the actuating parts in timer 37, backward through tube 63 and valve 60, exhausting to the atmosphere through exhaust port 64 in the body of valve 60, all of which will become more apparent in connection with the more detailed description of valve 60, later on. This valve 60 takes the place of a hand valve used for the same purpose, as shown and described in my aforesaid Patent 1,947,679. Thus releasing the compressed air from timer 37 through valve 60, will permit all the timer parts in timer 37 to reset themselves to zero, and by this act compressed air would be exhausted from cylinder 44, at switch box 2, and from cylinder 42 connected to the distributing gutter 19. When cylinder 42 is thus exhausted, the retrieving spring 65 therein, will draw gutter 19 back from trough 23, to trough 20, bringing this gutter again into its full line position shown in Fig. 1.

In connection with the present invention of continuous control for the centrifugals, the automatic manner in which this valve 60 is opened, to start the cycle timer, can be variously arranged or associated to co-act with any particular operation or function in the total cycle of the centrifugal as may be desired, but in the arrangement shown in Figs. 1 and 2, I illustrate this valve 60 as being coordinated with the automatic gate-closing means of gate 5, in manner to be hereinafter more fully described, so that the cycle timer 37 starts to measure the time approximately when gate 5 is automatically closed, and by means hereinafter described, I arrange so that this valve 60 is closed, to release the timer 37, at the beginning of the next cycle when charge 15 drops from basket 7, all of which will be more fully described later. I wish to point out, however, that the time in the total cycle, in which the timer 37 starts to function, and the time in the total cycle when it is released from the centrifugal and stops functioning, may easily be selected at times or operations of the total cycle that are different from those just mentioned, as the connections for making such changes would readily occur to those skilled in the art.

Also in Figs. 1 and 2, the tubes 38, 39, and 40 leading from timer 37, and the tube 63 leading to it, are the only ones that are fully extended and connected with the centrifugal A shown in these figures, but at the immediate places where these respective tubes 38, 39, 40, and 63 join the timer 37, will be noted three additional tubing leads each, unidentified by reference numerals, and it will be understood that these unidentified tubing leads will respectively pass and connect to additional centrifugals B, C, and D, which as previously stated are deemed to constitute with centrifugal A, a series or battery of four centrifugals, and it is, of course, understood that the connection of these unidentified leads from timer 37, to these other centrifugals, will be identical with the connections of their corresponding tubes 38, 39, 40, and 63, all as fully shown in these Figs. 1 and 2. These additional interconnections from timer 37, to such a battery comprising a plurality of centrifugals is also fully shown and described in my aforesaid Patent 1,947,679.

This concludes the description of the said cycle timer which automatically governs on a time cycle such operations of the total cycle as most effectively lend themselves to control on a timed basis, but as previously remarked, the particular cycle timer shown and described is illustrative only of general styles or types of such equipment, and I wish again to point out the number and kind of cycle operations that come under this cycle timer can be greatly varied, or increased or decreased in number, or in some cases practically omitted entirely, all depending on the industry and material on which the centrifugals are operated; and also the particular construction and operation of the cycle timer can be entirely different from the one which I have indicated, as corresponding with my Patent 1,947,679, as I have shown and referred to this merely to illustrate such equipment in general, and any cycle timer whatever, that is found suitable, can be substituted in connection with my more general invention described herein.

Since air valves like valve 60 will be subsequently mentioned in this specification, I shall now pause to describe same in connection with the detailed view in Fig. 6. This valve consists essentially of a cylindrical body member 66 with threaded nut 67 fastening the valve to some supporting bar or plate 68, and through the axis of this valve body 66 from end to end thereof passes a round hole of variable diameter along its length, and having a downwardly-facing valve seat 69 and also an upwardly facing valve seat 70, with a side opening and tubing connection generally designated as 71 entering the valve body between seat 69 and 70, and also radial exhaust ports 64 below side opening 71. Into the upper end of the central axial hole through the valve body enters a supply tube connection generally designated as 73. In the central hole of the valve body operates a stem having an upwardly-facing valve surface 74 registering with seat 69, and a downwardly-facing valve surface 75 registering with seat 70. On the stem the valve surfaces 74 and 75 are a little further apart than valve seats 69 and 70 of the valve body so that the stem 76 has a small vertical movement in the above-described axial hole 77 that passes through the valve body. The air supply line is connected to this valve at the top through tubing connection 73. The cylinder or other apparatus to be actuated by this valve is connected thereto by means of the side outlet tubing connection 71. If an upward force is applied to the bottom of the stem at 78, the stem is lifted into its position shown at Fig. 6. In this position the valve is closed at seat 69 but open at seat 70, and air passes from the supply connection at the top to the side outlet connection 71 to actuate the cylinder or other equipment to which the latter is connected, and so long as stem 76 is held upward in this position the valve is said to be open and compressed air continues to be applied to said cylinder. When the upward force is removed from point 78, so that valve stem 76 falls, it is evident that the valve will close at seat 70 and open at seat 69, so that the air from supply connection 73 is cut off, and the air in the cylinder or other device will pass backward through side tubing connection 71, downward past valve seat 69 as the valve is now open at this place, and will exhaust to the atmosphere through exhaust opening 64. If the valve shown in Fig. 6 is the one designated as valve 60 in Figs. 1 and 2, then the pipe or tubing connection 62, being the compressed air supply pipe, will enter the valve body at the top through tubing fitting 73, and the tube 63, Figs. 1 and 2, will connect to the valve body through the side tubing connection 71.

Having already described some of the automatic control apparatus, especially that which is related with timer 37, I will now turn the description to the automatic means for starting the centrifugal, also the automatic means for opening the charging gate and the automatic means for closing the charging gate, and then establish the sequence or association of these, and also some other parts, with the cycle timer, etc., to show how the operation of the centrifugal is made continuous through cycle after cycle.

As an illustration of one form of device that cooperates in the automatic starting of the centrifugal, I have shown in Figs. 1 and 2 air cylinder 79, having piston 80 and piston rod 80', the latter being connected to previously-described crank 46 at the position shown in the figures. Compressed air is supplied to cylinder 79 through suitable fittings from tube 81 which connects into the side opening corresponding to 71, Fig. 6, of an air valve 82, Figs. 1 and 2, this air valve being constructed identically like previously-described valve 60. The compressed air is supplied to valve 82 through tube 83 communicating with supply pipe 59 in Figs. 1 and 2. Obviously if valve stem 76 is raised, compressed air will actuate the piston in air cylinder 79 and will rock switch lever 13, of switch 2, from its full line position at the right, Figs. 1 and 2, to its dotted line position 13', and as previously stated, this will turn the electric power on the centrifugal motor 1, and release brake 3, thereby starting the centrifugal.

Of course, various other styles and types of equipment could be contrived, in lieu of that just described, for automatically turning the power onto the motor to start the centrifugal, but the apparatus which I have described for this purpose works well and serves as an illustration of one form or application of this invention, so far as this portion of the mechanism is concerned.

To proceed with the description I will now say that the manner of actuating valve 82, or any other apparatus or expedients that may be substituted for valve 82, to start the centrifugal, will depend somewhat on the character of the basket with which the centrifugal is equipped, and the manner in which the charge is removed from the basket at the end of the cycle. For instance, if an ordinary flat-bottom basket is used, with some sort of an automatic mechanical discharger for removing or discharging the mass from the basket, then cooperative arrangement or connection should be established between such mechanical discharger and valve 82, or substitute for latter, to co-act for starting the centrifugal in proper cooperative relation with respect to the action of such mechanical unloader.

On the other hand I find it simpler to use an open bottom self-discharging basket of any of the various types, a good illustration of one type being shown in my Fig. 1 of the drawings. In this type of basket, the charge is removed at the end of the cycle, by simply falling from the basket at or close to the moment when the basket comes to rest, and in one form of the invention herein described I find it practical to take advantage of this falling of the charge from the basket to control the starting of the centrifugal on its next cycle. Obviously some sort of baffle or other equipment could be located at a suitable place below the basket, in the path of the charge as it falls therefrom, to take advantage of the latter action for controlling the starting of the centrifugal on its next cycle; but all things considered, I prefer to use instead, for the last-named purpose, some sort of a charge-measuring shoe that is cooperatively arranged with relation to the basket to allow the shoe to contact and glide, at least some of the time, on the revolving charge 15 in the basket, such shoe preferably having some sort of a pivotal mounting, either around some horizontal axis, or around some vertical axis, to permit it to swing to and fro, and I also prefer that such shoe either through the nature of its mounting or by inclusion of some expedient like a spring, should normally swing outward toward the basket wall, so that when the charge is removed from the basket, the shoe may be free to move outward as just stated, and while the charge is building up in the basket during the charging thereof, the shoe should, by contact with this revolving and upbuilding charge in the basket, swing away from the basket wall. I like to take advantage of this swinging of the shoe to control at least one, and preferably both, of the following automatic actions, namely, to control the starting of the centrifugal by such swinging of the shoe toward the basket wall after the charge is removed from the basket, and to control the automatic closing of charging gate 5, in manner that will be hereinafter described, by the swinging of the shoe away from the basket wall under its contacting action with the upbuilding of the charge in the basket during the charging of the centrifugal. In some forms of my invention it would be possible, and practical to a degree, to use this swinging action of the charge-measuring shoe to directly actuate the air valve 82, Fig. 1, or any other expedient or apparatus substituted therefor, for starting the centrifugal, and controlling the charging of the basket, but I prefer not to do this directly, but rather to interpose an electric circuit that is either made, or broken, or both, by the swinging action of the shoe, and by means of such electric circuit I prefer to actuate and bring about the automatic starting of the centrifugal, and control of the charging gate. Since I find it advisable that the shoe should in some manner be arranged to normally swing toward the basket wall, I consider it to be further advantageous to incorporate in the arrangement some retarding expedient for the shoe, somewhat in the nature of a damper or fluid-controlled dash-pot, suitably associated to retard the movement of the shoe as it swings outward toward the basket wall after the charge has dropped from the basket, but to interpose either a minimum resistance, or no resistance whatever to the movement of the shoe as it swings away from the basket wall during charging. The purpose of such retarding action is, that when the charge falls from the basket, the shoe should commence to swing outward rather slowly under the retarding influence just mentioned, so as to afford the lapse of a sensible period of time before the shoe swings out far enough to start the centrifugal, as this lapse of time is helpful in insuring that all the charge falls from the basket, to prevent the centrifugal from starting with only a portion of the charge removed.

My preferred form of this charge-measuring shoe and its associated expedients and parts previously referred to, is indicated generally by reference numeral 84, Figs. 1 and 2, and the detailed construction thereof is suitably illustrated in Figs. 3, 4, and 5. In this preferred form, the thickness-measuring shoe 85 is pivotally mounted to rotate on a vertical axis or shaft 86, see preferably Figs. 3 and 5, this shaft being carried by bearings 87 and 88, Fig. 5, respectively carried in a cylindrical chamber 89 and cap or cover 90 for same. The chamber 89 has an extending bracket portion 91 by means of which the device can be fastened to the top of centrifugal curb 6 in the position indicated in Figs. 1 and 2. The spring 92, see Fig. 5, is connected to normally urge or swing shoe 85 outward toward the basket wall indicated by line 93 in Fig. 3. In other words, if there is no charge in the basket, the shoe will normally swing from its full line position 85 to its dotted line position 85', see Fig. 3, and then as the charge builds up inwardly in the basket, the latter revolving in the direction of the arrow shown in Fig. 3, the shoe by contacting with this revolving charge will slowly swing around in a clockwise direction until the charge surface 94, Fig. 3, brings the shoe into its full line position 85 which approximately represents a full charge in the basket. For the purpose of effecting the damper or dash-pot expedient previously referred to, that retards the speed of movement of shoe 85 in its rotation toward the basket wall, counter-clockwise as viewed in Fig. 3, the cylindrical chamber 89 has a baffle 95 extending radially inward, see Fig. 3, to make a nice sliding fit against the cylindrical member 96 that is fixed to shaft 86 by rivets 97. This cylindrical member 96 acts as a stop to keep shaft 86 from slipping down out of chamber 89, and it also serves to carry as a fixed part thereof the outwardly extending radial baffle 98 that rotates with the shaft and member 96. At its outer extension baffle 98 slides with nice fit over the inner surface of cylindrical chamber 89, and baffle 98 also carries the check valve 99 that is pivotally mounted on pin 100, see Fig. 5, this valve 99 having the small aperture 101 therein. The space within the cylindrical chamber is filled with oil, or other suitable fluid, and since the baffles 95 and 98 fit nicely between the cover 90 and the floor of chamber 89, it follows that as shoe 85 rotates counter-clockwise in Fig. 3, that is, as it swings toward basket wall 93, the said fluid in cylindrical chamber 89 will retard or dampen the movement and make it proceed slowly as the fluid passes through the small aperture 101 of check valve 99 which remains closed and seated during this movement; but when the shoe swings in the opposite direction, that is clockwise or outward, away from basket wall 93, there will be practically no retarding movement because check valve 99 will open on pin 100 and allow the fluid to pass freely with practically no dampening action. As previously indicated, the purpose of the retarding or dampening action just described, is to insure that a short delay will be provided between the moment when the charge commenced to fall from the basket and the moment when the centrifugal is automatically started, to make sure that substantially all the charge will have had time to fall from the basket before the centrifugal started the next cycle. This will become more apparent later.

Instead of using directly the swinging action of shoe 85 to open or close valve 82, Figs. 1 and 2, or any substituted mechanism for this valve and its associated parts, I have previously stated that I prefer to interpose as electric circuit, the making and breaking of which is controlled by shoe 85, and which circuit in turn controls or effects the actuation of valve 82 or other equipment substituted therefor, and I will now describe this electric circuit and one form of making and breaking mechanism thereof, reference being principally to Figs. 3, 4 and 5.

On the block of insulating material 102, Figs. 4 and 5, is mounted two similar bearing members 103, which guide and support curved rod 104, this rod 104 being the first member of a slidable carriage which I am about to describe, and it will be understood that rod 104 can freely slide back and forward in said guides or bearings 103, within limits. The remaining parts, comprising the slidable carriage just referred to, consist of a second curved rod 105, and two heads 106 and 106', and also two similar compression springs 107 mounted on rod 105. The heads 106 and 106' are respectively pinned or otherwise suitably fastened to rods 104 and 105, so as to make a unitary slidable carriage of same. Permanently fastened to cylindrical member 96, and therefore rotatable therewith is a radially projecting arm 108, having in its upper edge a notch 109, see Fig. 5, in which fits or rests rod 105 of the carriage arrangement just described, the two springs 107 lying respectively one on each side of this notch of arm 108, the washers 109' serving to make good contact between these springs and the arm. Of course the notch 109 is sufficiently wide to permit rod 105 to slide back and forth freely therein, and I might further remark that rod 105 may rest on the bottom of this notch so that support is thereby given to the slidable carriage, so that this support, together with the additional support of the two guides or bearings 103, holds the carriage approximately in its position shown in Figs. 3, 4 and 5, except that the carriage can slide back and forth sideways. At the lower outer ends of the two bearings 103 are mounted two dogs 110 and 110', the same being pivotally secured to said bearings 103 by screws 111, and the tortion springs 112 are arranged to normally urge said dogs to rotate clockwise as viewed in Fig. 5. The two dogs 110 and 110' are so spaced with respect to each other, and with respect to the heads 106 and 106', see Fig. 3, that these heads comprising the slidable carriage, are alternately restrained or engaged by these dogs, the latter acting as a stop, as is approximately indicated by the relative position of head 106' and dog 110', in Fig. 3. In this figure the other dog 110 is deemed to have been previously rotated sufficiently counterclockwise as viewed in Fig. 5, to release its coacting carriage head 106 from its engaging action with dog 110, and that release permitted the carriage to slide to the left, as viewed in Fig. 3, and consequently the opposite head 106' of the carriage thereby became engaged with its coacting dog 110' as shown in this Fig. 3, the dog 110' having been rotated into this engaging position by action of its torsion spring 112. If, from the position of the parts as viewed in Fig. 3, it be assumed that the arm 108 now moves or swings to the right in this figure, then this arm, will engage and compress the right-hand spring 107, acting through the right-hand washer 109', and will therefore urge the above described carriage to slide to the right because the right-hand spring 107 abuts against the right-hand head 106', but the carriage will be restrained and prevented from sliding to the right because dog 110' engages head 106' to prevent this head and therefore this entire carriage from shifting to the right. If it be now assumed, however, that the right-hand spring 107 being thus compressed under the continued movement of arm 108 to the right, and that the dog 110' be then slightly rotated in a counterclockwise direction as such dog would be viewed in Fig. 5, then it is apparent that this dog would presently release head 106', and the latter together with the entire carriage of which it forms a part, would instantly snap to the right in view of the compression previously built up in the right-hand spring 107 under the assumed continued movement of arm 108 to the right, as viewed in Fig. 3. When the carriage snaps to the right in this manner it is of course understood that the opposite head 106 would become engaged by its dog 110, in the same manner that Fig. 3 shows head 106' to be engaged by dog 110', and when the carriage is thus located in the opposite position from that actually shown in Fig. 3, and if arm 108 then swings toward the left, the left-hand spring 107 will be compressed until dog 110 is rotated in counterclockwise direction as viewed in Fig. 5, to thereby disengage this dog from the left-hand head 106 of the carriage, and upon such disengagement it is obvious that the carriage will snap rapidly to the left, as viewed in Fig. 3. I will now describe the manner in which dogs 110 and 110' are rotated to produce the disengagement of the carriage in the manner just described. By means of a screw 113, best seen in Fig. 5, a sector shaped cam 114 is fastened to the bottom of arm 108, in such manner, however, that this cam is free to pivot about the vertical axis of screw 113. The actual sector shape of this cam is best seen in Fig. 3, from which view it will be seen that on the outside of screw 113 this cam member has an outwardly projecting lug 114', while on the inward side of the screw 113 lies the true sector portion of this cam which is bounded on the right side by a straight edge $114^2$ and on the left side by a similar straight edge $114^3$. In the full line position of the parts, as shown in Fig. 3, the lug 114', of the sector shaped cam 114, is deemed to have contacted the stationary, but adjustable stop pin 115, and to have thereby swung itself sufficiently around counterclockwise on pin 113, in Fig. 3, the swinging of arm 108 having been clockwise during this action, so that the left-hand face $114^3$ of cam 114, contacted the lower leg of dog 110 and rotated the latter to release the carriage head 106 from this dog, whereby the entire slidable carriage snapped to the left into its full line position shown in Fig. 3. In this position of the parts, and as previously described, the right-hand dog 110' will have moved into engaging relation with respect to right-hand head 106', as indicated in Figs. 3 and 4, especially the latter. If from this position of the parts it be now assumed that arm 108 swings to the right, that is counterclockwise in Fig. 3, then the lug 114', of cam 114, will presently come in contact with another stationary but adjustable stop pin 115', as shown by assumed or phantom position of the lug shown in dot and dash lines at $114^4$, Fig. 3, and while making this contact, under the further continued counterclockwise rotation of arm 108, it is evident that cam 114 will swing around rapidly, clockwise on its axis, until its right edge $114^2$ will contact dog 110' and rotate it to release carriage head 106', whereupon the carriage will snap quickly to the right under the compression force that was built up in the right-hand spring 107 during such movement of arm 108 to the right, all as viewed in Figs. 3 and 5. This snapping of the carriage once to the right and once to the left, all under the influence or control of the swinging of the charge measuring shoe 85, which in fact is what causes the swinging motion just described of arm 108, is taken advantage of, to make and break the previously described electric circuit, in the following manner. Carriage head 106' is equipped with a projecting metallic tongue $106^2$ which is wide enough, as viewed in Fig. 3, to gap across the two electric contactor clips 116 and 117 and connect them electrically to each other when tongue $106^2$ passes into these clips, to close or make the previously described electric circuit, and obviously this circuit is opened or broken when tongue $106^2$ slips out from the clips by virtue of the previously described carriage snapping to the left. In other words, as this carriage snaps back and forth in the manner previously described, its motion goes far enough when snapping to the right to close the electric circuit by causing tongue $106^2$ to electrically join clips 116 and 117 together, and when snapping to the left it goes far enough to break the electric circuit by withdrawing this tongue from the metallic clips 116 and 117. Through suitable insulating bushings 118 in cover 90, see Fig. 4, these clips 116 and 117 are connected with copper leads 119 and 120, see also Figs. 1 and 2, where the external connection of these leads comprising the circuit, are shown. Before concluding the description of Figs. 3, 4 and 5, I would like to add that the positions of the stops 115 and 115' are adjustable by virtue of these stops being threaded into lugs 121 and 121' as indicated by the threaded ends 122 and 122' of these stops.

Also I would like to remark that in Figs. 3, 4 and 5 the full line positions of the parts show same when the said electric circuit has been broken because of charge measuring shoe 85 having been swung sufficiently from the basket wall, the slidable carriage having just snapped into this position; but dotted line positions of various parts in these drawings show their respective positions when the charge measuring shoe has swung sufficiently toward the basket wall to permit the carriage to have snapped to the right to close the electric circuit. Obviously the predetermined positions of the shoe 85 at which said circuit is made and broken while the shoe swings to and fro, can be adjusted or changed by screwing the stop pins 115 and 115' in or out of the chamber lugs 121 and 121', Fig. 3. From the detailed description just given of the parts shown in Figs. 3, 4 and 5 it is thought that the operation of this mechanism is self evident as follows, namely, when the charge falls from the centrifugal basket spring 92 slowly moves shoe 85 outward toward the basket against the retarding action of the oil or other fluid in chamber 89, and when the shoe approximately reaches a predetermined position during this swinging action the electric circuit will be made by virtue of the carriage snapping to the right. As will be shown in a moment this making of the electric circuit contributes to the automatic starting of the centrifugal, and subsequently to the automatic opening of charging gate 5, and thereafter as the charge pours into the revolving basket and builds up on the basket wall, the charge measuring shoe 85, by contact with this revolving and upbuilding charge, will swing outward away from the basket wall, there being practically no resisting or retarding of this movement from the fluid damper because check valve 99 permits free fluid flow in this direction, and presently during this latter swinging movement of shoe 85, at approximately the predetermined place where the required charge is in the basket, said electric circuit is broken, by virtue of the carriage in chamber 89 having snapped to the left, and as will be presently understood this results in automatically closing the charging gate to terminate the charging action.

Referring now to Figs. 1 and 2, it is seen that the electro-magnet 123 is included in the circuit coming from said mechanism 84. The plunger 124 of said electro-magnet is connected to pivoted lever 125, which normally rests down on stop 126. In this last named position there is clearance between this lever 125 and the bottom of valve stem 76, of air valve 82, so that the latter is closed. When the charge falls out of the basket, however, and shoe 85 swings toward the basket wall and closes the circuit, the electro-magnet 123 is energized to lift plunger 124 and pivoted lever 125, and in obvious manner this lifts valve stem 76, opens valve 82, and in manner previously described starts the centrifugal by actuating the switch crank 46 by means of air cylinder 79. This illustrates how the automatic starting of the centrifugal is controlled by the falling of the sugar from the basket, or how in the particular form of the mechanism disclosed, the automatic starting of the centrifugal can also be said to be controlled by the swinging of charge measuring shoe 85 toward the basket wall after the charge is removed from the basket.

I will now describe how charging gate 5 is automatically opened and closed. A reference to Figs. 1 and 2 shows this gate supported and carried by a well known conventional arrangement consisting of two levers 127 which at their rear ends are both keyed to a shaft 128, to which is also keyed a forwardly projecting lever 129. To the forward end of this last named lever, through a link 130 is connected the lower end of piston rod 131 of the gate opening cylinder generally designated by reference numeral 132. Since the further connections to this gate opening cylinder 132, as respectively shown in Figs. 1 and 2, are different, I will now proceed with their descriptions separately, and will commence with same as shown in Fig. 1.

In this figure a water connection 133, leading from a water storage tank 134, enters gate opening cylinder 132 at its upper head connection 135. For a purpose that will be discussed in a moment, tank 134 is located at a sufficient elevation to maintain a constant and adequate downward pressure on the upper side of the double acting piston 136 in said cylinder 132. To supply compressed air for acting upward on the lower side of said piston 136, a tube 137 enters said cylinder near the bottom, this tube having communication as shown in Fig. 1, with the air cylinder 79, through an opening 138 in the side of same. This cylinder, it will be remembered is the one that actuates switch 2, to start the centrifugal. When piston 80 of cylinder 79, actuates switch 2 to start the centrifugal, it is understood that in the course of this downward movement of piston 80, bye-pass connection 138 into this cylinder is uncovered and the compressed air bye-passes from the cylinder 79 through tube 137 into the bottom of cylinder 132, and since the pressure of the compressed air just referred to, and now acting upward in cylinder 132, is substantially greater than the water pressure from tank 134, which always acts downward in cylinder 132, it follows that the difference in these two pressures will result in a net upward pull on piston rod 131, which serves to open charging gate 5 in a manner which is well understood by those acquainted with the art. The charging gate being thus opened, and the centrifugal having started to turn a few moments before, the charging of the centrifugal will proceed in the usual manner, until the upbuilding charge wall in the basket, swings shoe 85 sufficiently away from the basket wall to break the electric circuit in which solenoid 123 is included, and thereupon, in self evident manner, the magnet core 124 and lever 125 will fall, closing the air valve 82, and as previously described this will result in exhausting backwards through tube 81 the compressed air below piston 136 in the gate opening and closing cylinder 132, and also all compressed air from the power-on cylinder 79. Thereupon the downward water pressure from tank 134, acting on piston 136, will promptly and automatically close the charging gate 5. The action just described illustrates how this charging gate is automatically closed by a means controlled by the quantity of charge fed to the revolving basket, or it may also be said that the automatic closing of the charging gate is controlled by the swinging action of the charge measuring shoe.

The extent to which the gate is automatically opened is determined by location of the stop pin 139 in the series of holes shown in the standard 140, it being understood that the top edge of charging gate 5 will bump against stop pin 139, the opening of the gate being limited or arrested thereby.

I now wish to point out that in connection with the automatic gate opening mechanism, it is desirable to include some form of retarding expedient for controlling said gate opening means to permit the basket to acquire a perceptible rate of rotation before the charge is actually admitted to the basket. If the speed of the basket is not high enough to throw the charge off of baffle 12, Fig. 1, with sufficient centrifugal force to cause the charge to build up on the wall of the basket, then the charge would simply fall down through the open bottom of the basket due to the insufficient speed of the latter, and this of course cannot be permitted in practice. In Fig. 1, aided by Fig. 7, I have illustrated one form of retarding means for the purpose just stated, and in Fig. 2 I have illustrated another form of such retarding means, used for the same purpose, this latter form in fact being in the form of a revolvable governor, the coaction of which is directly affected by the speed of the centrifugal as will be subsequently described. I will first describe the form of this retarding expedient as shown in Figs. 1 and 7.

Fig. 7 shows that above piston 136, the piston rod is reduced in diameter at 141 and at the extreme top it has an enlarged portion 142 which fits very closely, but slidably, in hole 143 of the cylinder head 144. The dimensions of the parts are such that when charging gate is entirely closed so that piston 136 is at the bottom of its stroke, the enlarged portion of the piston rod 142 is located in hole 143 in approximately the position shown in Fig. 7. Now if compressed air is admitted to the cylinder below piston 136, for the purpose of opening charging gate 5, it is apparent that the water in the cylinder above piston 136 can escape only slowly through port 145, which is throttled down by the adjustable needle valve 146, beyond which the water passes through port 147 and then up and out of the cylinder freely, through pipe 133, into storage tank 134, as illustrated in Fig. 1. Since the water is escaping only slowly through needle valve 146, piston 136 rises but slowly, although as it rises the enlarged portion 142 of the piston rod slowly rises through hole 143 in the cylinder head. Presently this enlarged portion 142 will pass completely out of hole 143, and attain a position above it such as is shown dotted at 142', Fig. 7. In this position it is obvious that the water above piston 136 will escape from the cylinder much more readily, as it can now pass directly up through opening 143, and out through pipe 133 to the storage tank. In other words, as soon as the enlarged portion 142 of the piston rod, escapes from hole 143 of the cylinder head, the speed by which the piston 136 rises in the cylinder is greatly increased. In practice the dimensions of the parts are adjusted so that the resulting initial slow opening of gate 5 takes place during the period when gate 5 is traversing the lap that such gates have, before the gate really opens the opening of the discharge spout 14, Fig. 1, to permit the charge to really pour into the basket. But at approximately the place where the gate leaves the lap, and really commences to open the discharge spout, the enlarged portion 142 of the piston rod in cylinder 132, is just leaving opening 143, so that immediately thereafter the gate 5 commences to open rapidly. By correctly adjusting the setting of needle valve 146, Fig. 7, this moment when the charging gate really commences to open to admit the charge to the basket, can be retarded or delayed until the centrifugal reaches any desired speed at which the charging should really commence. This illustrates one form of the retarding expedient controlling said automatic gate opening means to permit the basket to acquire perceptible rotation before the charge is actually admitted to the basket. When the basket is fully charged, and the compressed air is released from below piston 136, the piston moves downward rapidly to the complete lower end of its stroke, to quickly and completely close charging gate 5, the lap included, because on the down stroke the water enters cylinder 132 from tank 134 through check valve 148 and large port 149, see Fig. 7, as well as through needle valve 146 and opening 143. Before describing the retarding expedient illustrated in Fig. 2 for controlling the automatic gate opening means to permit the basket to acquire perceptible rotation before admitting the charge, I prefer to describe some other parts illustrated in Fig. 1, and will now proceed to do this.

I refer to mechanism which can sometimes be omitted, but which I like to include in my invention for effecting a preliminary washing of the basket between the removal of the charge therefrom, and the admission of the next charge thereto. In centrifuging some materials, as for instance sugar crystals suspended in syrup, the filmasse gradually smears or clogs the openings in the foraminous basket wall, and as such clogging proceeds the efficiency of the centrifuging diminishes, which is of course undesirable. To prevent this, I like to pour a preliminary spray of wash fluid on the basket wall when empty, to clean it, between cycles. To do this I use equipment associated with the previously described wash fluid valve 26, see Figs. 1 and 2. In other words, I use the same wash water valve that serves to control the washing of the spinning charge under the time control previously described. The parts shown in Fig. 1 for producing this preliminary washing, are illustrated in more complete detail in Fig. 8. A detailed description of wash fluid valve 26 is omitted from this application, as the construction and operation of same is fully illustrated in my previous aforesaid Patent No. 1,947,679, and for the further reason that the construction and operation of such valve is well known to those skilled in the art. In the form of this valve as shown in Figs. 1, 2 and 8, however, there is a modification, in that the piston rod 150, of air cylinder 41, not only passes down into the body 26 where the fluid valve itself is located, to open this valve when compressed air is admitted to cylinder 41 through tube 38, but in addition this piston rod 150 extends up through stuffing box 151 and terminates in its top end 152 outside of cylinder 41. Obviously if pressure is applied downward on the top end 152 of this piston rod, the wash fluid valve 26 will open, and wash fluid will be sprayed into the basket, the same as though this valve opening action occurred through admission of compressed air through tube 38, Fig. 8, acting downward on air piston 150'. To effect the preliminary washing of the empty basket, I apply a downward push to the top end of piston rod 150, by means of lever 153, pivoted on stationary pin 154, and this lever is actuated in obvious manner by cylinder 155. This cylinder is pivotally mounted at 156, the piston rod thereof being in two parts 157 and 158, telescopically adjustable with respect to each other by screw connection 159, the adjustment being locked by lock-nut 160. The head end 158 is preferably square in section but beveled off at the top as indicated at 161, the square body of this head being guided in the square hole 162. The compression spring 163 in this cylinder normally holds the piston rod down out of engagement with lever 153, until compressed air is admitted below piston 163' to elevate the same until the stop 164 bumps against the top of the cylinder at 165. This latter action limits the upward movement of the piston rod in cylinder 155, and it is obvious that the extent to which the wash fluid valve 26 is opened at this point, depends upon how far the screw adjustment 159 between piston rod 157 and the head 158, of cylinder 155, is extended. The further these parts are extended, the further will piston rod 150 of cylinder 41 be depressed, and the further will wash fluid valve 26 be opened, and conversely the less parts 157 and 158 are extended by the screw adjustment, the less will wash fluid valve 26 be opened, and the slower will the water spray into the basket through nozzle 21. In the position of the parts shown in Fig. 8, it is apparent that while the preliminary washing of the basket is occurring under action of cylinder 155, the wash fluid valve 26, is not open to the same degree that it will be opened for the actual washing of the charge in the basket when compressed air is admitted through tube 38, to open wash fluid valve 26, by depression of piston 150'. The reason for this is that when the compressed air in cylinder 41 opens the wash fluid valve, the stem is depressed until piston 150' comes down on stop 166 in cylinder 41. In the position of the parts shown, however, see Fig. 8, cylinder 155 was not able to open wash fluid valve 26 so far, the difference being represented by the clearance between the bottom of piston 150' and stop 166, in cylinder 41. The difference in this degree of opening between the supplementary washing of the more or less empty basket, and the actual washing of the charge in the basket, is determined by the screw adjustment 159 between stem 157, and head 158, of cylinder 155. The reason for such different degree of opening of valve 26, for these different washing purposes, is that frequently less water is needed for the preliminary washing, than the permissible time for applying it would give if the water were turned on full force during the preliminary washing. By reference to Fig. 1 it is seen that compressed air is admitted to cylinder 155 through the tube 137, which is supplied with compressed air when piston 80, of power-on cylinder 79, uncovers side opening 138 during the process of automatically starting the centrifugal, and the moment the compressed air bye-passes from cylinder 79 out through this opening 138, the piston 163', of cylinder 155, rises, and head 158 engages lever 153 and pushes it into the position shown in Fig. 8, whereby, through depression of piston rod 150 of cylinder 41, the wash fluid valve 26 was opened, to start the preliminary washing of the basket. This illustrates one mode of interconnecting the automatic starting means with the automatic washing means for automatically actuating the washing means to start washing the basket at approximately the time when the starting means starts the centrifugal rotating. Various other arrangements could be contrived for effecting the same purpose. I will now describe the arrangement illustrated in Fig. 8, for terminating this supplementary washing of the empty basket.

Tube 137 is shown to convey compressed air into cylinder 167 above piston 168 thereof, at the same time that this tube 137 conveys compressed air into cylinder 155. As piston 168 and its associated piston rod 169 is pushed downward under action of this compressed air, the lower end of this piston rod will presently contract the arm 170 comprising a portion of cylinder 155, and will rock the same counterclockwise around pivot pin 156, see Fig. 8, to approximately dotted line position of this cylinder as shown in this figure, and of course during this rocking motion the lever 153 will become clear of piston head 158 of cylinder 155, and thereupon piston rod 150 of cylinder 41 will snap upward under the action of compression spring 171 in cylinder 41, and the wash fluid valve 26 will close, thereby terminating the preliminary washing of the empty basket. Of course the action in cylinder 167 must be retarded, or else it would act so fast, and trip cylinder 155 off lever 153 so rapidly, that there would be practically no preliminary washing of the basket. The retarding expedient used for this purpose, as in the form illustrated in Fig. 8, is quite like the retarding expedient illustrated for another purpose in Fig. 7. In other words, the pipe 133 communicating with storage tank 134, see Fig. 1, enters the bottom of cylinder 167, and the water being free to enter the cylinder through check valve 172, pushes upward on piston 173. Since pistons 168 and 173 move together, their speed of movement in a downward direction is obviously retarded, because check valve 172 promptly closes during this movement, thereby forcing the water to be expelled from the cylinder through port 174, the same however being restricted to the desired degree by means of the adjustable needle valve 175, Fig. 8. After escaping past this needle valve, the water enters pipe 133 and flows toward the storage tank 134. In view of the restriction created by the needle valve, it is obvious that the depression of piston rod 169 under action of the air pressure above piston 168, can be retarded to any desired degree, and I like to adjust this retarding action so that wash fluid valve 26 closes at approximately the moment when charging gate 5 has traversed its lap, and is about to actually open the spout 14 to really admit the charge to the revolving basket.

At the end of the charging action, when valve 82, with the connections therefrom as shown in Fig. 1, closes, the compressed air from cylinders 155 and 167 is exhausted backward through tube 137, through cylinder 79, through tube 81, and out to the atmosphere through valve 82. This quickly causes piston rod 169 of cylinder 167 to rise, because the water can flow freely into the cylinder from pipe 133 upward through check valve 172, which offers no obstruction in this direction, and piston rod 169 is rapidly lifted by the water pressure. This releases cylinder 155, and the tension spring 176, Fig. 8, draws this cylinder over clockwise around pivot 156, until stop 177 engages the face of bracket 178, and supports cylinder 155 in its position actually shown in Fig. 8. The downward movement of the left side of lever 153 is arrested by stationary stop 179, Fig. 8. In cylinder 167, member 180, is a stop member loosely embracing piston rod 169 and serving to limit the downward movement of the pistons and piston rod of cylinder 167.

I will now turn to the description of Fig. 2 which illustrates one of various possible modified forms of this invention. In this Fig. 2 parts that are similar, or substantially similar, to those shown in Fig. 1, bear like reference numerals, and such of these parts as have been previously described in connection with Fig. 1 will not be again described in connection with Fig. 2 as their construction, operation and co-action with the other parts should be apparent from the description previously given.

In referring to Fig. 2, I will commence with the description of the form of retarding expedient which it illustrates for controlling or retarding the automatic gate-opening means to permit the basket to acquire a perceptible rate of rotation before the charge is actually admitted to the basket, this modified apparatus illustrated in Fig. 2 being in lieu of apparatus previously described as included for substantially the same purpose in Fig. 1, the latter being centered generally around gate-opening cylinder 132 as illustrated in Fig. 7, and Fig. 1. Since the previously-described purpose of this retarding expedient is to insure that the charge does not actually enter the basket, until the rotating speed of the latter has risen sufficiently so that the charge builds up properly on the basket wall, instead of falling down through the basket because of too little speed, I desire to remark that the form of this retarding expedient illustrated in Fig. 2, operates on this question positively and directly, because it is itself governed by the rotation of the basket, being in the nature of an ordinary speed governor. In Fig. 2 this governor, illustrated generally by reference numeral 181, is mounted immediately above drive motor 1, and its parts rotate with the shaft of motor 1, which means also that the rotation of this governor and the centrifugal spindle 4 will be identical, because the motor and spindle are direct connected to rotate always at the same speed, and the governor parts are connected to rotate directly with the motor shaft. This governor controls the opening and closing of an electric circuit 182. This governor is of the well-known type that opens the electric circuit 182 when the governor speed falls below a certain adjustable speed. At real low speed or at rest this circuit will therefore be open because of the governor, but as the speed rises and reaches the speed at which it is set or adjusted to operate, it will close the circuit 182 and current will flow therethrough unless otherwise interrupted. Since governors of this sort are common and well known, I have illustrated same only diagrammatically at 181, Fig. 2, because it is as unnecessary to incumber this application with the details of such governor as it is with the details of drive motor 1 itself. There are various types of the governor just described, and any of these types would be suitable. Should the motor and spindle 4 be not direct connected, but have a slip clutch between, then such governor can readily be arranged to be driven by belt, friction, or otherwise, from centrifugal spindle 4, to insure that the governor will co-act with the spindle and basket speed.

In this electric circuit 182, coming from the governor 181, is an electro-magnet 183 of standard form, having the movable armature core 184 connected with valve lever 185 which normally rests down on stop 186 when there is no current in solenoid 183; but when the latter is electrically energized, it will in obvious manner lift valve lever 185 to lift valve stem 187' of an air valve designated generally by reference numeral 187, the construction of the last-named valve being identical with that of valve 60, as illustrated in Fig. 6. Compressed air is supplied to this valve into its top end through pipe 62, and when this valve 187 is opened, the compressed air will issue from same through tube 188 passing into the bottom of gate-opening cylinder 189, to push upward on the bottom of double-acting piston 190 therein. A hydraulic back pressure acting downward, is set up in this cylinder by water that enters above piston 190, through pipe connection 191 leading from supply tank 192, the elevation and purpose of the latter being substantially identical with that of previously-described supply tank 134 of Fig. 1.

Since the speed of governor 181 is set to close the circuit 182, when the spindle and basket speed reach a sufficient point to insure good charging, it follows that when such retarding action of governor 181 has delayed sufficiently, and the correct moment is reached for actually admitting the charge to the basket as determined by the basket speed, the governor will act for this purpose by closing circuit 182, and if the subsequently-described automatic switch 193 is closed at this time, it is apparent that electro-magnet 183 will operate to open air valve 187, and the gate-opening cylinder 189 will immediately open the gate, with no initial retardation while the gate lap is being traversed, as was described in connection with cylinder 132 of Figs. 1 and 7. This illustrates how the automatic opening of the charging gate is controlled by the rotation or speed of the basket, which in the form illustrated is the same as saying that it is controlled by the governor and electric circuit emanating therefrom.

The automatic switch 193, Fig. 2, is actuated by electro-magnet 194 which has the armature core 195, the latter being normally at rest on a stop 196, at the bottom of its stroke when electro-magnet 194 is not energized; but when this magnet is energized, by virtue of circuit 120 being closed, then the armature core 195 rises and closes the circuit 182, across automatic switch 193. If the current in circuit 120 is subsequently interrupted, the magnet coil 194 will be de-energized, armature 195 will fall, and automatic switch 193 will open. Tracing the circuit 120 back through electro-magnet 194, Fig. 2, to the left, it is seen that this circuit is also controlled by the charge-measuring device 84, through the swinging action of charge-measuring shoe 85, previously described. When the former charge has been removed from the basket to let charge-measuring shoe 85 swing toward the basket wall, the circuit 119 and 120, which is under the control of shoe 85, will close, and this will simultaneously close the automatic switch 193 just referred to, and will also, through magnet valve 123 and 82, admit compressed air through tube 81 to the power-on cylinder 79, to start the centrifugal. Automatic switch 193 being thus closed when the centrifugal starts, it is obvious that as soon as the governor 181 closes the circuit 182, the charging gate will actually open and admit charge to the basket as previously described. When this charging then reaches a point where the charge-measuring shoe 85 swings sufficiently to open circuit 119 and 120, indicating that the charging of the basket is substantially finished, it is apparent that automatic switch 193 will instantly open, thereby breaking circuit 182, de-energizing the electro-magnet 183, closing air valve 187, and this last act will exhaust the compressed air from beneath piston 190 of gate-opening cylinder 189, and consequently the water pressure from tank 192, pushing piston 190 downward, will effect the quick automatic closing of the charging gate. Therefore, in the form of my invention illustrated in Fig. 2, it is apparent that the automatic starting of the centrifugal is controlled by the removal of the charge from the basket, also that the retarded opening of the charging gate is controlled by the rotation of the centrifugal basket, and that the automatic closing of the charging gate is in its turn controlled by the quantity of charge fed into the basket.

In Fig. 2, the equipment for supplying the preliminary washing of the empty basket through nozzle 21, is the same as that described for the same purpose in connection with Fig. 1, so far as affects wash fluid valve 26, cylinder 41, lever 153, and the pivotally-mounted cylinder 155, and all parts and details immediately associated with these. In Fig. 2 compressed air is supplied to cylinder 155, for starting this preliminary washing, through a tubing connection 137', which communicates with the power-on cylinder 79 through by-pass opening 138', these connections corresponding with those designated as 137 and 138 in Fig. 1. To stop this preliminary washing of the empty basket in Fig. 2, however, the simple cylinder 197 is substituted for cylinder 167 of Fig. 1. This cylinder 197 of Fig. 2, is in communication with valve 187, through tube 188, which also communicates with gate-opening cylinder 189, from which it is apparent that when the charging gate opens, cylinder 197 of Fig. 2, will be actuated to extend piston rod 198 therefrom until stop 199 butts against the bottom of the cylinder, the obvious effect of this operation being to swing cylinder 155 counter-clockwise to its dotted position shown in Fig. 2, thereby serving to close wash fluid valve 26, to terminate the preliminary washing of the basket, in identically the same manner in which such rocking action of cylinder 155 produced the same results as previously described in connection with Fig. 1 and Fig. 8. When air valve 187, Fig. 2, is closed at the end of the charging operation, this exhausts the compressed air from cylinder 197, backward through tube 188, and the spring 200, in cylinder 197, pushes the piston rod 198 upward, allowing cylinder 155, Fig. 2, to rotate back clockwise to assume approximately the vertical full line position of this cylinder shown in Fig. 2. Since air valves 82 and 187 close at the same time, when approximately the full charge is in the basket, it is apparent that the compressed air is exhausted about simultaneously from cylinder 197, and cylinder 155, of Fig. 2.

In connection with the preliminary washing of the empty basket, either under the arrangement illustrated in Fig. 1 or Fig. 2, I would like to remark that by connecting cylinder 155 with the by-pass opening 138 or 138' of the power-on cylinder 79, that actuates switch 2, it follows that switch 2 must first be thrown to start the motor before the compressed air can pass onward to cylinder 155, so there is a small delay between the instant when the basket starts and the preliminary spray is emitted from nozzle 21 into the empty basket. This very slight delay is desirable, as it tends to insure that the basket is in motion when the spray commences. In a sense this arrangement is a retarding expedient, to retard the starting of the preliminary washing a trifle with respect to the actual starting of the basket. Though I prefer to start this preliminary washing either at or slightly after the moment when the basket commences to turn, the moment for stopping it is not so well determined. Various times could be selected for that purpose. In general I like to stop it at approximately the same time that the charge commences to enter the basket, but other times from this could be used, and in connection with some products or materials that the centrifugals may be working on, it might even be permissible or desirable to allow the preliminary washing to continue while the charge is being admitted to the basket. In this view, I would say that my invention merely contemplates that this preliminary washing should terminate at some suitable moment before the charging of the basket terminates.

In connection with the previously-described cycle timer 37, which it is understood governs such steps or operations of the cycle, if any, as are best controlled on a time basis with respect to each other, I stated that the time cycle which this timer governs, is started by the lifting of valve stem 61 of valve 60, but I did not describe the actual operation of doing this in relation to the other parts of the total centrifugal cycle. Obviously, the starting of this cycle timer 37 could be associated with various operations in the total centrifugal cycle, depending on the detailed nature of the latter as determined by the particular material being centrifuged. But for various reasons I find it particularly advantageous to start such cycle timer, when same is used, at the moment when the charging gate 5 is closed, to indicate the end of the charging. Therefore, in Figs. 1 and 2, I am illustrating mechanism for actuating valve 60 to start the timer in association with the gate-closing means. This mechanism consists of a lever pivoted at 201, and being flexible on the side 202 beneath valve stem 61 of valve 60, and being a rigid bar 203 on the other side of the pivot. Mounted on a bracket 204, which is itself carried on the gate-opening lever 129, and which, therefore, goes up and down with this lever as the gate control cylinder 182 or 189 actuates the same, is a dog 205 pivoted at 206, and normally urged to swing clockwise about pivot 206 by spring 207. When the gate 5 closes, dog 205 descends, engages the left end 208 of the valve lever and pulls same downward slightly, and consequently the right-hand end 202 of this lever contacts and lifts valve stem 61 of valve 60, to start the cycle timer 37 approximately in association with the closing of charging gate 5 as just stated. The right-hand end 202 of the valve lever is made flexible to allow over travel of dog 205, because the exact closed position of gate 5 varies slightly in practice, and such variation is compensated by the flexing of lever arm 202, such flexed position being shown in dot and dash line in Fig. 1. For the purpose of closing valve 60 to release the centrifugal from the cycle timer 37, and thereby allow the timer parts in the latter to reset themselves at their respective initial positions awaiting the next cycle, I provide cylinder 208 having piston 209, piston rod 210 and retrieving spring 211 for moving the piston and piston rod to the right, this cylinder being shown partly sectioned in Fig. 1. Both in Figs. 1 and 2, compressed air is supplied to this cylinder 208 by means of tube 81, the latter being a part of the tube system that supplies compressed air to power-on cylinder 79, for starting the centrifugal at the beginning of each cycle. Spring 211 in cylinder 208 should be quite strong to insure that piston rod 210 of this cylinder will retrieve the moment the air pressure on piston 209 falls below its usual maximum. When, at the beginning of the cycle, compressed air enters power-on cylinder 79 and timer-disengaging cylinder 208, the compressed air from timer 37 may still be energizing and acting in power-off cylinder 44, to hold the power off against the attempted action of power-on cylinder 79, but as the air pressure approaches maximum in cylinder 79 and cylinder 208, the piston rod in latter will eventually move out leftward against spring 211, and by abutting against dog 205, and rotating same counter-clockwise about pivot 206, will thereby release the lever 203, and in obvious manner this lever will be pulled upward by spring 212 and allow valve 60 to close, thereby releasing this centrifugal from timer 37, and allowing the latter to reset its timer parts at initial position,. This latter action will exhaust the compressed air from power-off cylinder 44, and consequently the compressed air that is energizing power-on cylinder 79 will then be free to actuate the latter to throw switch 2 and start the centrifugal in obvious manner.

In regard to Fig. 2, I wish to point out an important feature of my invention, namely, that the opening of charging-gate 5 is impossible in case there is anything the matter with the motor or motor circuits that would prevent the starting of the motor. If the motor should fail to start, but, nevertheless, the charging-gate be opened, so that the charge flows through the non-revolving basket and out of its open bottom, the consequences might be serious, especially since the action would continue until somebody noticed that this is going on.

My invention shown in Fig. 2 affords protection against this, because if the centrifugal does not turn, governor 181 will not close circuit 182, and air valve 187 will not be opened, and consequently the charging-gate 5 cannot open because cylinder 189 will not be energized by compressed air from valve 187. In fact, it could be said that the introduction of a governor 181 in such manner as to revolve only with the basket, is a positive insurance and protection against automatic opening of charging-gate 5, when the basket is not rotating, and this comprises another especial and important advantage of a speed controlled governor, or its equivalent, as part of my invention.

The description of the various parts of the control equipment for automatically governing one centrifugal through cycle after cycle, being now completed, I will at this point review the entire operation of this equipment throughout one cycle to make certain that the interaction of the various elements in the equipment is clear, and to show that it is sufficient for automatically leading the centrifugal through cycle after cycle without requiring any human intervention for this purpose.

Assuming that the centrifugal is slowing down toward rest at the end of the cycle, and that the charge is removed from the basket at the end of the cycle, this being done by allowing the charge to merely fall from the basket when latter is of the variety illustrated in Figs. 1 and 2, it may be said that the next cycle begins at this point in the following manner. Charge-measuring shoe 85 swings slowly outward toward the basket wall, the movement being induced by spring 92 but dampened and retarded by the fluid in device 84, and in the course of this swinging action of shoe 85 the electric circuit controlled thereby and represented by wires 119 and 120 is snapped closed, electro-magnet 123 is energized, air valve 82 is opened, power-on air cylinder 79 is actuated to throw switch 2 and start drive motor 1, this latter act having been preceded however by the compressed air having also passed into kick-off cylinder 208, the actuation of which tripped dog 205 off lever end 203 to close air valve 60, the latter action having resulted in disconnecting the centrifugal from timer control 37, so that this timer can reset itself in well-known manner to the initial or starting position for its various timers, this having also resulted in exhaustion of air from power-off cylinder 44, which thereby permits the power-on cylinder 79 to actuate the switch 2 for turning the power onto motor 1 as just stated. Power-on cylinder 79 having been thus actuated, the compressed air from same will be bypassed through connection 138 and tube system 137 into the bottom of gate-opening cylinder 132, and into supplementary valve-opening cylinder 155, the latter immediately opening the wash fluid valve 26 so that the preliminary spraying of the empty basket to clean it, commences at approximately the same moment when the basket starts to revolve, or at an exceedingly brief interval thereafter. The compressed air entered the top of retarding or timing cylinder 167 at the same time that it entered its associated valve-opening cylinder 155 and the gate-opening cylinder 132. Because of the retarding expedient with which cylinder 167 is equipped, the latter will move slowly, but after the lapse of an appropriate period, its piston rod 169, having contacted the arm 170 of valve-opening cylinder 155, will thereby trip the latter, close wash-fluid valve 26, and terminate the preliminary washing of the basket. While this preliminary washing was proceeding, the basket speed was increasing, and the plunger mechanism in gate-opening cylinder 132 was rising slowly under restraint by the retarding expedient of cylinder 132, until the lap of charging-gate 5 was traversed, and the charging opening actually starts to uncover, to actually admit charge to the revolving basket at about the time when the speed of the latter is sufficient to receive the charge, and thereafter the gate-opening cylinder 132 rapidly opens gate 5, as the cylinder at this point becomes substantially released from the influence of its retarding expedient, as was previously described. The gate is now fully open, the charge is pouring into the basket and is building itself up in ever thickening manner inwardly on the revolving basket wall, and all the while the charge-measuring shoe 85 is being swung away from the basket wall, inward, because of its gliding contact with the upbuilding charge wall in the basket. When the shoe has swung far enough in this direction to indicate a properly filled basket, the electric circuit which it controls, and which is represented by wires 119 and 120, is snapped open, electro-magnet 123 is de-energized, air valve 82 is closed, and the compressed air is exhausted through valve 82 from gate-opening cylinder 132, this compressed air passing backward through power-on cylinder 79 toward and out of valve 82, because plunger 80 in cylinder 79 is below the side-opening connection 138 at this time. Of course the compressed air is exhausted at the same time from power-on cylinder 79, kick-off cylinder 208, retarding cylinder 167, and supplementary valve-opening cylinder 155, and the plunger in cylinder 208 retrieves under the impulse of its retrieving spring 211; the plunger 169 of cylinder 167 retrieves upward under the impulse of the water pressure from tank 134, and the supplementary valve opening cylinder 155 resets itself toward initial position as previously explained in connection with Fig. 8. The compressed air being exhausted from gate-opening and closing cylinder 132, the charging gate 5 closes rapidly under action of water pressure entering cylinder 132 from tank 134. The closing of this charging gate opens air valve 60, by means of dog 205 having contacted lever side 203 and raised lever side 202 as previously described during closing of the gate, the valve stem 61 of valve 60 having been thus lifted by lever arm 202. Opening of valve 60 starts into timing operation the timing parts in mechanism 37, corresponding to this centrifugal, and these timing parts being adapted to automatically control on a time basis or time cycle, those operations of the total centrifugal cycle which best lend themselves to control on a time basis. In the particular operations governed by this timer as selected for illustration in Figs. 1 and 2, they result successively in opening and later closing wash fluid valve 26, through actuation of cylinder 41, to start and stop the spraying of the revolving charge in the basket, also the shifting of gutter 19 from trough 20 to trough 23, and the stopping of the centrifugal by supplying compressed air to power-off cylinder 44, which actuates switch 2 to cut off the power from motor 1 and apply brake 3 to the centrifugal. The timing of these successive steps or operations just described is indicated respectively by pointers 47, 49, 51, and 53 on cycle timer 37. In this position of the parts the centrifugal soon stops, or reaches low speed, the charge is removed from the basket, and the next cycle starts by the swinging of charge-measuring shoe 85 toward the basket wall, and the entire cycle just described is repeated time and again without requiring any human attention or intervention.

In many respects the operation of my invention when embodied in the form illustrated in Fig. 2, is identical with the operation just described for the form shown in Fig. 1. Certain differences arise however, and may be described as follows. When the charge is removed from the basket, and charge-measuring shoe 85 swings outward toward the wall of the basket, this results in actuating power-on cylinder 79 to start the centrifugal, actuating kick-off cylinder 208 to release the centrifugal from the cycle timer, and actuating valve-opening cylinder 155 to commence the preliminary spraying of wash fluid onto the basket, in about the same way that these operations occur in Fig. 1. Power-on cylinder 79 has no communication however with the gate-opening cylinder. The gate-opening cylinder 189 in this form of my invention is opened when air valve 187 is opened, and this occurs when governor 181 indicates that the basket speed has reached a sufficient point to make charging proper. At this moment the governor closes electric circuit 182, and this energizes magnet valve 183 to open air valve 187 for the purpose of opening the charging gate to admit charge to the basket as previously described. At the same time compressed air from valve 187 issues to trip-off cylinder 197 which is actuated to trip cylinder 155, and thereby stop the preliminary washing at approximately the time when the charging gate 5 opens. The automatic switch 193 in the governor circuit 182 will have been closed for permitting the actions just described to function, because electro-magnet 194 will be energized because the circuit 119 and 120, controlled by charge-measuring shoe 85 of device 84, will be closed continually, from the time the centrifugal starts until the charging is finished. In fact, when the charging is finished and shoe 85 breaks the circuit 119 and 120, this de-energizes electro-magnet 194, opens the automatic switch 193 by allowing the heavy plunger 195 to pull it down, and circuit 182 being thus opened, electro-magnet 183 will be de-energized, and air valve 187 will close. This latter results in exhausting the compressed air from below plunger 190 of gate-opening and closing cylinder 189, so that the gate promptly closes by virtue of the water pressure from tank 192 urging the plunger 190 of gate cylinder 189, downward. At the same time the plunger 198 of cylinder 197 rises under impulse of the retrieving spring in this cylinder, and valve-opening cylinder 155 will fully retrieve because it is released from cylinder 197 and because the air from it is exhausted back through power-on cylinder 79 and out through air valve 82 which closes by interruption or opening of electric circuit 119 and 120 at approximately the same moment that air valve 187 closes. Except as to the differences in operation between the equipment of Figs. 2 and 1, as just described, the other operations of Fig. 2 are substantially the same as their corresponding operations previously described for Fig. 1, except in matters as have been hereinbefore described in detail, or as may be obvious from comparison of the drawings.

In Figs. 1 and 2 there are some supplementary hand switches, notably switch 33 in the relay circuit 32 of Fig. 1, joining switch box 2 with magnet switch 30; and also hand switch 213 in the circuit represented by wires 119 and 120, leading from device 84, and controlled by charging shoe 85. These small hand switches, and others that may be inserted at other parts of the circuit where desired, serve various emergency purposes where manual control over the apparatus may be temporarily desired during the emergency. For instance, the manual opening of hand switch 213 would prevent the entire centrifugal from starting and same would stay at rest indefinitely until this hand switch were again manually closed; or if the centrifugal be deemed already started and in the act of charging, and this hand switch 213 be then opened, the charging gate 5 will promptly close, and power-on cylinder 79 will be promptly de-energized, so that lever 13 of switch 2 can be manually swung to cut off power from drive motor 1 and set brake 3, to shut down the centrifugal in case this is desired for any reason.

I have now described the continuous control apparatus illustrating a form of my invention as applied to a single centrifugal, but as originally stated in this application, it is very rare, if ever, that these centrifugals are operated singly, and in practice it is substantially a universal custom to operate these centrifugals in groups or batteries, comprising a plurality of such centrifugals all driven from a common power source of some sort for each such group or battery.

Now since only a portion of the previously-described cycle steps are on a time-control basis, namely those illustrated as under the control of cycle timer 37, and the remainder of the cycle operations, such for instance as the length of time required for charging, and also the length of time required for braking, i. e., the time between when brake 3 is set and when the basket is stopped sufficiently to remove the charge, are not on a time-control basis because certain conditions about them render their control on a time basis impractical, it follows that the time required for the actual total cycle of each centrifugal in the battery will tend to vary more or less from the others, and therefore if the centrifugals are turned loose to operate continuously under the control apparatus thus far described, it follows that they will practically never operate in any sequence, or approximate sequence, with respect to each other, but they will be continuously changing around in their respective phase relations to each other, and this will occasionally result in all or too many of them starting their cycles at substantially the same time. This is hardly practical as such simultaneous starting of all or too many of the centrifugals of the battery, invariably results in an unbearable overload on the common power source that supplies power for driving all the centrifugals in the group or battery. In many cases this would be sufficient to render such continuous centrifugal control impractical and useless, and for that reason the pace-making equipment which I am about to describe for keeping said centrifugals in some sort of approximate successive pace with respect to each other, and thereby prevent the serious and almost condemnatory results just described, is an essential and important feature of my invention, at least as to some aspects thereof.

The purpose of this pace-making equipment is to cause the respective centrifugals in the battery to successively start upon their cycles, one after the other with an appreciable time period between each. In this way the starting load thrown upon the common power source by the starting of each centrifugal, is spread out more or less uniformly as the centrifugals respectively start at different times, and the common power source can handle the total load easily because the centrifugals are not permitted to bunch up and throw their starting loads on the power source almost simultaneously for all the centrifugals. When it is realized that in some types of modern centrifugals, the starting load runs as high as 60 horse-power per centrifugal, whereas the full speed running load (after the energy of momentum has been supplied to bring the centrifugal to full speed), is only 5 or 8 horse-power, it is apparent that the centrifugals should not be permitted all to start at once, but that their successive startings should be spaced apart from each other as indicated.

The embodiment of the equipment relating to this aspect of my invention can be arranged in various forms. For instance my pace maker or pace-controlling means can be in the nature of an adjustable time controller that affects all the centrifugals in the battery, and sort of interrupts or restrains the automatic starting of each centrifugal until a certain time is reached, whereupon that centrifugal is released and permitted to start, if it is otherwise ready, and the termination of such interruption is successively accorded to one centrifugal after the other, with a time period, either adjustable or not, between such successive releases of the various centrifugals, to permit them to start, or my pace-controlling means can be of a form that has some sort of interconnections between the centrifugals, one with the next, so that the starting of each centrifugal is in some manner controlled by the cycle of a preceding centrifugal in the series, this last-named form of my pace-maker depending either solely on such interconnections between the centrifugals, or having such interconnections along with some timing arrangement, and the successive starting of the centrifugals being brought about by the combined action of the interconnections and the timing arrangements.

In the drawings I have illustrated one form of such pace-controlling mechanism that is simple, efficient and practical, and that relies solely upon some interconnections between the centrifugals, one with the next one, for keeping them in approximate successive pace with respect to each other. In this form of my pace maker, most of the equipment therefor is housed in a little box generally represented by reference numeral 216, Figs. 1, 2, 9, 10, and 12. The electric circuit represented by wires 119 and 120, and entering device 84, Figs. 1 and 2, to be controlled therein by charge-measuring shoe 85, will be seen to enter this device 216, see Figs. 1, 2, 9, and 12, the wire 119 of this circuit being parted for this purpose. Inside of box or device 216, see Fig. 9, the severed wire 119 is seen to be respectively connected to a switch comprising two resilient leaves 217 and 218 fastened to a stationary insulator block 219, and at their outer extremities these switch leaves are equipped with make and break contact members respectively designated as 217' and 218'. In Fig. 9 this switch is seen to be closed across contact points 217' and 218', but in Fig. 11 this switch is seen to be open and the circuit of wire 119 is, therefore, broken across the contact points 217' and 218'. Such making and breaking of the circuit through this switch is effected as follows. A manually operable lever 220 that operates up and down throughout the limits of slot 221 in the wall of box 216, carries a lug 222 to the under side of which is attached an insulating lug 222', and adapted in the downward course or movement of lever 220 to push resilient leaf spring 218 downward to make contact across said contact points 217' and 218'. A tension spring 223 normally raises this lever 220 to its upper position shown by dotted and dash line in Fig. 9, and this lifts lug 222 off of the resilient leaf spring 218 and opens the switch by allowing the parts to take their normal position shown in Fig. 11. Mounted on pivot 224 above this switch, is cylinder 225 having plunger 226, plunger rod 227 and retrieving spring 228, the latter acting to normally lift plunger 226 until rod 227 clears lug 222 of the lever. Mounted also on this pivot 224 is a latch or dog 229 that swings into place over lug 222 after the latter has been pushed down by plunger rod 227 to close the switch, the purpose of this latch 229 being to hold the switch closed even if plunger 227 should be prematurely lifted by escape of the compressed air from above plunger 226 through tube connections 230. The tension springs 231 and 232 are respectively attached to ears forming part of latch 229 and cylinder 225, so that these two members normally and separately are urged to rotate counter-clockwise about pivot 224, as viewed in Fig. 9. For a purpose that will be presently described another stationary cylinder 233 is mounted in this box, see Fig. 9, this last-named cylinder having a plunger 234, stop 235, retrieving spring 236 and plunger rod 237 connected to a wide plunger head 238 that is mounted outside of a wall or baffle 239 extending across this cylinder, except for a hole through which plunger rod 237 slides freely. It is seen from Fig. 10 that the plunger head 238 is wide enough to contact dog 229 and piston rod 227 of cylinder 225, both for the purpose of acting as a stop for these members 227 and 229 against the rotative action of their respective springs 232 and 231, and also to sweep both of them to the left, as viewed in Fig. 9, off of lug 222 of lever 220, when compressed air is supplied to cylinder 233 to actuate the same. When such actuation of plunger head 238 occurs, the parts 227 and 229 are swept over to their respective positions shown in Fig. 11, releasing lug 222 from their influence, thereby lifting this lug and lever 220, and breaking the circuit across line or wire 119 by separating contact points 217' and 216' by bringing these latter parts into position shown in Fig. 11. If the compressed air is subsequently exhausted from cylinder 233, its plunger parts including head 236 will be retrieved under influence of spring 236 to the position shown in Fig. 9, and if the compressed air is also exhausted from cylinder 225, its plunger will rise or telescope into its cylinder under action of its spring 228 to approximately the extent illustrated in Fig. 11, and plunger head 236 of cylinder 233 being at this time in the position shown in Fig. 9, cylinder 225 will be rotated until its axis is exactly vertical with its plunger rod 227 butting against plunger head 238 of cylinder 233, the latter acting as a stop for this purpose. If compressed air be then again introduced into cylinder 225 through connections 230, the lug 222 and lever 220 will again be depressed into their respective positions shown in Fig. 9 and the circuit of wire 119 will again be closed through contact members 217' and 216'. The manner of interconnecting said cylinders 225 and 233 with the centrifugals is illustrated in Figs. 1, 2, and 12. Fig. 12 it will be understood is presented principally to illustrate the interconnections between the various centrifugals in that form of the equipment which I am here describing in detail to illustrate one example of my broad conception of controlling such a battery of centrifugals to operate in successive phase pace with respect to each other as previously mentioned. For this purpose Fig. 12 indicates a battery of four centrifugals, their respective center lines being indicated as A, B, C, and D, and each of these center lines being intended to indicate a complete centrifugal with all its automatic equipment, etc. as is indicated in detail for the first centrifugal A in Fig. 1 or 2. In Fig. 12 most of these parts are omitted for purposes of clearness, only such of them being shown as are required to illustrate the interconnections between the centrifugals that I am here endeavoring to describe. The first centrifugal A in the battery of four centrifugals shown in Fig. 12, being the same centrifugal A that is illustrated in detail either in Fig. 1 or 2, the respective parts and equipment shown clustered about center line A in Fig. 12 are seen to bear the identical reference numerals as the same parts bear in Figs. 1 and 2, while the corresponding parts clustered about center lines B, C, and D, Fig. 12, either bear the same reference numerals, or else they differ only by the addition of the exponent B, C, or D, to assist in the description. With this understanding of Fig. 12 the interconnections can readily be understood as follows. The compressed air connection 230 to cylinder 225, Fig. 9, of the device 216 of one centrifugal, is connected to tube 63 of air valve 60 of another centrifugal, see Fig. 12. In other words, connection 230 of the device 216 of the first centrifugal A is connected to the tube 63$^D$ of valve 60$^D$ of centrifugal D, while the similar connection or tube 230$^B$ of device 216$^B$, of centrifugal B, is connected to tube 63 of valve 60 of centrifugal A; also the connection or tube 230$^C$ of device 216$^C$ of centrifugal C is connected to tube 63$^B$ of valve 60$^B$ of centrifugal B, while connection or tube 230$^D$ of device 216$^D$ of centrifugal D is connected to tube 63$^C$ of valve 60$^C$ of centrifugal C, and so on for as many additional centrifugals, if any, as there may be in the battery. As to tube 240 connecting to cylinder 233, Fig. 9, of device 216 of any centrifugal, it will be seen from Figs. 1, 2, and 12, that this connects with tube 38 of the same centrifugal, this tube 38 being the one that leads to air cylinder 41 of the wash water valve 26 of that centrifugal. Since the nature of this connection for each centrifugal is thought clear enough from this statement, and from Fig. 12, I will not in this description trace this connection separately for each centrifugal. Also it is apparent from Figs. 1, 2, 9, and 12, that the wire 119 entering device 216 of any centrifugal is the wire 119 which Figs. 1 and 2 show as being connected to electromagnet 129 and the shoe control device 84 of each centrifugal, and further description of this connection for the various centrifugals is thought unnecessary.

From the detailed description just given of the parts and interconnections between the centrifugals, it is thought apparent how same cooperate to keep the various centrifugals in a successively retarded step one after the other between themselves as an illustration of my pace-controlling equipment. As an illustration, if the centrifugals shown in Fig. 12 are considered spinning in their spaced phase relation to each other, and we assume that centrifugal B has gone past the place in its cycle where its charge in the basket has been washed by operation of its wash fluid valve 26 under action of compressed air fed to its cylinder 41$^B$ through tube 38$^B$ from cycle timer 37, then its circuit 119 through its device 216$^B$ will be open or broken, because during the washing operation just described compressed air from tube 38$^B$ will have passed up through tube 240$^B$ to device 216$^B$ and through the actuation therein of its kick-off cylinder 233, the switch that controls its electric circuit through wire 119 will be opened, and will temporarily stay open, as previously described. If we now assume that centrifugal B, which should always follow centrifugal A in retarded phase relation to it, has for some reason gotten out of such step with centrifugal A, and has too soon come to rest, dropped its charge, and allowed its charge-measuring shoe 85 (not shown in Fig. 12, but illustrated instead in Figs. 1 and 2) to close the electric circuit which its charge-measuring shoe 85 controls, including its wire 119, Fig. 12, then, although in the absence of the pace-controlling means, centrifugal B would be able to immediately proceed on its next cycle, and in that manner perhaps creep into worse phase relation, nevertheless, because its automatic starting means is now interrupted by the pace-controlling means (this interruption in the illustrated form of the equipment consisting in the circuit through its wire 119 being open or broken, because its switch in its device 216$^B$ is open), it follows that centrifugal B will be restrained or retarded, and cannot start, but will be obliged to remain idle until centrifugal A has proceeded far enough in its next cycle so that centrifugal B can be released to start its cycle and thus remain in retarded phase pace with respect to centrifugal A, and by analogy with respect to the other centrifugals, and these with each other. The automatic starting means of centrifugal B will not be released from its interrupting means in box 216$^B$, until the tube or connection 230$^B$ transmits compressed air thereto from centrifugal A upon the opening of air valve 60 of centrifugal A. This latter, however, will not occur, until centrifugal A has started on its next cycle, completed its charging action, and upon closing of its gate 5, has opened its air valve 60 to connect centrifugal A with timer 37. This opening of air valve 60 of centrifugal A transmits compressed air through tube or connection 230$^B$ into cylinder 225 of device 216$^B$ of centrifugal B, and thereupon, in manner previously described the switch in device 216ᴮ will be closed, and the circuit across wire 119, Fig. 12, will be completed, and the entire circuit through wires 119 and 120 as illustrated in Fig. 1 or 2, having been deemed previously completed in device 84, under control of the charge-measuring shoe 85, of centrifugal B, it is apparent that centrifugal B will now start immediately after the completion of the charging of centrifugal A. This serves to illustrate the coaction between the different centrifugals, and though the illustration is as between centrifugals A and B, it is apparent that substantially the same relation will be maintained successively as between all the centrifugals in the battery, so that the centrifugals will each separately operate continuously through cycle after cycle, and yet they will keep in successive retarded step one after the other, and no centrifugal will be permitted to advance its cycle operations against the others ahead of a predetermined phase pace within which they are to successively operate with respect to each other.

In case trouble arises on any centrifugal, such as might require a shutdown of that centrifugal for repairs, that centrifugal can easily be cut out of the series in manner illustrated in Fig. 12. For this purpose a valve 241, 241ᴮ, 241ᶜ, and 241ᴰ is permanently inserted in tube connections 230, 230ᴮ, 230ᶜ, and 230ᴰ of the respective centrifugals. These valves are normally open. If we assume however that centrifugal B must be shut down for repairs, then valve 241ᶜ of centrifugal C is closed and a temporary connection 242, not normally included, and, therefore, shown in dotted lines in Fig. 12, is made joining tube 230ᴮ of centrifugal B, with tube 230ᶜ of centrifugal C, as shown. With this connection inserted and valve 241ᶜ closed, then, when centrifugal A opens its valve 60, the compressed air therefrom will pass through temporary tube connection 242 into device 216ᶜ of centrifugal C, so that centrifugal C takes the place of centrifugal B in the series, and centrifugal B can be made to remain idle by opening its hand switch 213, Figs. 1 and 2, until repairs are finished, at which time temporary connection 242 is removed, valve 241ᶜ is opened, switch 213 is closed and centrifugal B is thus cut back and takes its place in the operating series as before.

Of course, I have selected four centrifugals as illustrating the plurality that comprises the battery, but it is self-evident that a larger or smaller number could be used and the connections between them would be of the same character previously indicated for the four centrifugals shown. Also, if there are a large number of centrifugals in the group, say, for instance, ten, it might for some reason be found desirable to not operate them in exact sequence as between neighbors, or as between the entire group of ten centrifugals, and the interconnections may be made variously, as, for instance, to operate two centrifugals always in tandem, there being five such tandem groups of two each, and these five tandem groups can then operate in spaced phase relation as between such groups; or else the entire ten centrifugals can be divided into two groups of five centrifugals each so that the five in each group act in spaced phase relation with respect to each other, but the two groups act more or less independently of each other; or other special arrangements or groupings can be made, but all such variations are contemplated as part of my invention and are deemed included therein.

Before concluding I would like to remark, in connection with Fig. 3, that, while the centrifuging of the mass, for instance, sugar massecuite, proceeds, and the mother liquor passes out from the mass through the foraminous basket-wall 93, the inner cylindrical surface of the mass moves outward radially from 94, Fig. 3, and at the end of the cycle is approximately at position 94', Fig. 3.

Also, in connection with Fig. 5, a coarse adjustment of shoe 85 with reference to the sugar wall, is made possible by set-screws 300, which clamp this shoe to shaft 86.

Of course, as previously indicated, the detailed parts and portions of my apparatus, the arrangements thereof, and the connections and interconnections therebetween, as illustrated in the drawings, and hereinbefore described in detail, constitute only one form of my invention, and have been shown and described by me merely as an example of one of the many possible embodiments of my invention, it being understood that very extensive modifications, additions, omissions, or substitutions can be made therein without departing from the substance or spirit of my invention, which is limited only by the broad terms of the claims hereto appended, as I believe that my invention is basic and that I am a pioneer in the field to which this apparatus relates.

I claim:

1. In combination, a plurality of centrifugals, automatic control means cooperatively associated with said centrifugals to automatically operate each of said centrifugals continuously through cycle after cycle, each such cycle consisting of a sequence of automatically impressed operations including accelerating of the centrifugal as an operation in each cycle, a common power source and connections therefrom to each of said centrifugals for driving all of said centrifugals from said common power source, said automatic control means including automatic acceleration starting means for each centrifugal for automatically starting the accelerating of its centrifugal at a certain place in its cycle, and pace controlling means for said centrifugals, said pace controlling means being cooperatively connected with said automatic acceleration starting means of each centrifugal to cooperate therewith for starting the acceleration of said centrifugals in an approximate successive pace with respect to each other, for avoiding excessive loads on said common power source that drives all of said centrifugals.

2. In combination, a plurality of centrifugals, automatic control means cooperatively associated with said centrifugals to automatically operate each of said centrifugals continuously through cycle after cycle, each such cycle consisting of a sequence of operations including acceleration of the centrifugal as an operation in each cycle, a common power source for driving all of said centrifugals, said automatic control means including automatic starting means for each centrifugal for automatically starting the centrifugal, and pace controlling means successively interconnected between said centrifugals, said pace controlling means being cooperatively connected with said automatic starting means of each centrifugal whereby said automatic starting means of each centrifugal is governed by said pace controlling means to start its centrifugal after another centrifugal with which said pace controlling means is interconnected has passed a certain place in its cycle.

3. The combination of a centrifugal having a rotatable basket, starting means, charging gate, and gate closing means, with pivotally mounted charge-measuring mechanism adapted normally to swing toward the wall of said basket but capable also of swinging away from the wall of said basket under contact with the upbuilding charge in said basket during the charging thereof, means cooperatively associating said charge-measuring mechanism with said starting means of the centrifugal and with said gate closing means, for starting the centrifugal when said charge-measuring mechanism reaches a position while swinging toward the wall of said basket and for closing said charging gate when said charge-measuring mechanism reaches another position while swinging away from the wall of said basket under the contacting action of the upbuilding charge in the basket during the charging thereof.

4. The combination with a rotatable centrifugal having a basket, starting means, charging gate, and gate closing means, of a charge-measuring shoe pivotally mounted to swing toward and away from the wall of said basket, a spring mounted to normally swing said charge-measuring shoe toward the wall of said basket, said shoe being capable however of swinging away from the wall of said basket under the contacting action of the upbuilding charge during the charging of said basket, fluid-controlled damper mechanism adapted to retard the swinging of said charge-measuring shoe toward said basket, and mechanism controlled by the swinging of said charge-measuring shoe and cooperatively associated with said centrifugal starting means and said gate closing means, to automatically start said centrifugal when said charge-measuring shoe approaches the wall of said basket and to automatically effect the closing of said charging gate when said shoe is swung sufficiently away from the wall of said basket by the charge built up therein.

5. The combination with a rotatable centrifugal having a basket, starting means, charging gate, and gate closing means, of a charge-measuring shoe pivotally mounted to swing toward and away from the wall of said basket, and means controlled by the swinging of said shoe and cooperatively connected with said centrifugal starting means and with said gate closing means, to start said centrifugal when said charge-measuring shoe approaches the wall of said basket, and to effect the closing of said charging gate when said shoe swings sufficiently away from the wall of said basket.

6. In combination, a rotatably mounted centrifugal having a basket, starting means, charging gate, and gate opening and closing means, a device for controlling the automatic starting of said centrifugal and the automatic closing of the charging gate, said device embracing a charge-measuring shoe pivotally mounted on a vertical axis to swing toward and away from the wall of said basket, a spring mounted to normally swing said charge-measuring shoe toward the wall of said basket, said shoe being capable however of swinging away from the wall of said basket, fluid-controlled damper mechanism for retarding the swinging of said charge-measuring shoe, said damper mechanism being adapted to more vigorously retard said shoe while swinging toward the wall of said basket than while swinging away from the wall of said basket.

7. In combination, a rotatably mounted centrifugal basket, a charge-measuring shoe pivotally mounted on a vertical axis to swing toward and away from the wall of said basket, a spring mounted to normally swing said charge-measuring shoe toward the wall of said basket, said shoe being capable however of being swung away from the wall of said basket against the action of said spring, fluid-controlled damper mechanism for retarding the swinging of said charge-measuring shoe, said damper mechanism being adapted to more vigorously retard said shoe while swinging toward the wall of said basket than while swinging away from it, and electric circuit making and breaking mechanism including means for snapping the circuit on and means for snapping the circuit off, said circuit making and breaking mechanism being controlled by said pivotally mounted charge-measuring shoe to snap said circuit on during its action of swinging toward said basket and to snap said circuit off during its action of swinging away from said basket.

8. In combination, a rotatable centrifugal basket, starting means for starting the rotation of said basket, movably mounted means in said basket normally urged to move into the space normally occupied by the charge in said basket, and automatic control means cooperatively associated with said starting means and with said movably mounted means for actuating said starting means to start the rotation of said basket when said movably mounted means is moved into the space normally occupied by the charge in said basket.

9. In combination, with a conical bottom self-discharging centrifugal basket and the starting means therefore, of control means cooperatively connected with said starting means, and a movably mounted charge contacting shoe in said basket cooperatively associated with said control means and normally urged toward the wall of said basket, said shoe when released by the dropping of the charge from said basket being free to move toward the wall of said basket to thereby affect actuation of said starting means through the agency of said control means to start said centrifugal basket after the dropping of the charge therefrom.

10. In combination with a centrifugal having a conical bottom self-discharging centrifugal basket and the starting apparatus therefor, of means cooperatively connected with said starting apparatus and controlled by the dropping of the charge from said basket to actuate said starting apparatus to start the centrifugal, and a retarding expedient cooperating with said means to retard the starting of said centrifugal until the lapse of a short time after the charge has fallen from said self-discharging basket.

11. In combination with a rotatively mounted centrifugal basket, a charging gate for same, gate opening means, washing means for washing said basket, means for starting the action of said washing means, and means cooperatively associated with said washing means and with said gate opening means for stopping the action of said washing means approximately when said gate opening means is actuated to open said charging gate.

12. In combination, a rotatively mounted centrifugal basket, starting means for starting the rotation of said centrifugal basket, washing means for washing said basket, means cooperatively associated with said starting means and with said washing means to actuate the latter to wash said basket when the said starting means is actuated to start the centrifugal, and means for terminating the washing action of said washing means.

13. In combination a rotatively mounted centrifugal basket, starting means for starting said basket, stopping means for stopping said basket, washing means for washing said basket, means cooperatively associated with said washing means and with said starting means to actuate said washing means to give a supplementary washing to said basket approximately when said basket is started by said starting means, and time controlled means also cooperatively associated with said washing means for again actuating said washing means to wash said basket before said stopping means stops said basket.

14. In combination with a rotatably mounted centrifugal basket, a charging gate for same, gate opening means, washing means for washing said basket, and means cooperatively associated with said washing means and with said gate opening means for stopping the action of said washing means approximately when said gate opens to permit the charge to flow from said gate into said basket.

15. In combination with a rotatably mounted centrifugal basket, means for starting and rotating the basket, means for stopping the basket, washing means for washing the basket, and means cooperatively associated with said washing means and with said basket starting and rotating means in such manner as to start the operation of said washing means approximately when said basket starting and rotating means starts the rotation of said basket.

16. In combination, a rotatably mounted centrifugal having a basket, starting means for starting the same, a charging gate, gate opening means, washing means for washing said basket, means cooperatively associated with said starting means and with said washing means to actuate the latter to wash said basket approximately when the latter is started rotating, and means cooperatively associated with said gate opening means and with said washing means to stop the action of said washing means approximately when said gate opening means opens said charging gate.

17. The combination of a rotatably mounted centrifugal and its starting means, which said centrifugal is adapted to operate on a cycle including starting, charging, centrifuging the charge at speed, stopping, and removing the charge therefrom, and the similar subsequent restarting of said centrifugal, with a spray nozzle for spraying a wash fluid into said centrifugal, a wash fluid valve connected with said nozzle for controlling the flow of said fluid therefrom, a cycle timer, means controlled by said cycle timer for automatically opening and closing said wash fluid valve to apply a wash fluid to said centrifugal while the charge is centrifuging therein at speed, and supplementary means cooperatively connected with said centrifugal starting means for opening said wash fluid valve to effect a supplementary washing of said centrifugal when said starting means is actuated to start said centrifugal.

18. The combination of a rotatably mounted centrifugal and its starting means, which said centrifugal is adapted to operate on a cycle including starting, charging, centrifuging said charge at speed, stopping said centrifugal and removing the charge therefrom, with a spray nozzle for spraying a wash fluid into said centrifugal, a wash fluid valve and connections to said nozzle for controlling the flow of wash fluid from said nozzle, a cycle timer, means controlled by said cycle timer for automatically opening and closing said wash fluid valve to spray said wash fluid into said centrifugal while the charge is centrifuging therein at speed, supplementary means for opening and closing the aforesaid wash fluid valve to effect a supplymentary washing of said centrifugal when empty, and means providing a different degree of opening of said wash fluid valve when same is opened by said supplementary means than when same is opened by said cycle timer.

19. In combination with a rotatable centrifugal, starting means for starting the same, a charging gate and gate opening and closing means for charging said centrifugal, and automatic control means cooperatively associated with said starting means and with said gate opening means to automatically start the centrifugal and automatically open the said charging gate, said automatic control means including a retarding expedient to moderately retard the automatic opening of said charging gate after the automatic starting of said centrifugal to allow the latter to acquire moderate rotation before said charging gate is opened.

20. In combination with a rotatable centrifugal, starting means for starting same, a charging gate and gate opening and closing means for charging said centrifugal, and automatic control means cooperatively associated with said starting means and with said gate opening means to automatically start the centrifugal and automatically open said charging gate, said automatic control means including a retarding expedient controlled by the rotation of said centrifugal to moderately retard the automatic opening of said charging gate after the automatic starting of said centrifugal to allow the latter to commence rotation before said charging gate is opened.

21. In combination with a rotatable centrifugal comprising a driving motor, a centrifugal spindle and a centrifugal basket all associated to rotate under the influence of said driving motor, a charging gate, automatic gate opening means for opening said charging gate, means responsive to rotation and cooperatively associated with said centrifugal and with said automatic gate opening means to automatically open said charging gate after said driving motor has commenced to rotate.

22. In combination with a rotatable centrifugal basket, a charging gate therefor, automatic gate opening means for opening said charging gate, and means controlled by the rotation of said basket and cooperatively connected with said automatic gate opening means to actuate the latter for automatically opening said charging gate after said centrifugal basket has commenced to rotate.

23. In combination, a rotatable centrifugal basket, a charging gate therefor, means for automatically opening said charging gate, governor means mounted to rotate with said centrifugal basket, an electric circuit cooperatively connected with said governor means, said circuit being closed by said governor means when the centrifugal basket rotates at a perceptible speed, said means for automatically opening said charging gate being controlled by said electric circuit to open said gate when said circuit is closed by said governor means.

24. In combination, a rotatable centrifugal, a charging gate therefor, means controlled by the removal of the charge from the centrifugal for automatically starting said centrifugal, means controlled by the rotation of said centrifugal for automatically opening said charging gate, means controlled by the quantity of charge supplied to said centrifugal for automatically closing said charging gate, a cycle timer and means controlled by said cycle timer for automatically stopping said centrifugal.

25. In combination a rotatively mounted centrifugal basket, starting means for starting said basket, stopping means for stopping said basket, a charging gate and gate opening and closing means for charging said basket, washing means for washing said basket, time controlled means, means cooperatively associated with said washing means, also with said starting means, and with said gate opening means, to open and close said washing means to wash said basket between the starting of said basket and the opening of said charging gate, and means cooperatively associated with said washing means and with said time controlled means to again open and close said washing means under the influence of said time controlled means to again wash said basket before the basket is stopped by actuation of said stopping means.

26. In combination, a rotatable centrifugal, charging means therefor including a cut-off gate, a timer control for controlling on a time basis a centrifuging step that occurs subsequent to the closing of said cut-off gate, and means cooperatively interconnecting said timer control with said cut-off gate for starting the time measuring action of said timer control by manipulation of said cut-off gate.

27. In combination, a rotatable centrifugal, charging means therefor including a cut-off gate, a cycle timer control for controlling on a time basis certain cycle steps of the centrifugal that occur subsequent to the closing of said cut-off gate, and means cooperatively interconnecting said cycle timer control with said cut-off gate for starting the time measuring action of said cycle timer control by the closing of said cut-off gate.

28. In combination, a plurality of centrifugals, automatic control means cooperatively associated with said centrifugals to automatically operate each of said centrifugals continuously through cycle after cycle, each such cyle consisting of a sequence of operations including acceleration of the centrifugal as an operation in each cycle, a common power source for driving all of said centrifugals, said automatic control means including automatic acceleration starting means for each centrifugal for automatically starting the acceleration of its centrifugal at a certain place in each cycle, and pace controlling means for each centrifugal cooperatively associated with said automatic acceleration starting means of its centrifugal and also interconnected with another of said centrifugals, whereby said automatic acceleration starting means of each centrifugal is governed by said pace controlling means of its centrifugal to delay the starting of the acceleration of its centrifugal until after the other centrifugal with which said pace controlling means of its centrifugal is interconnected has passed a selected place in its cycle.

ROBERT ALEXANDER STEPS.